United States Patent
Ina et al.

(10) Patent No.: US 10,252,703 B2
(45) Date of Patent: Apr. 9, 2019

(54) SYSTEM FOR CLEANING ON-VEHICLE OPTICAL SENSOR AND METHOD FOR THE SAME

(71) Applicant: ASMO CO., LTD., Shizuoka-ken (JP)

(72) Inventors: Eiji Ina, Toyohashi (JP); Tomoyuki Kikuta, Toyohashi (JP); Keita Kawai, Toyohashi (JP); Yukihiro Matsushita, Hamamatsu (JP); Keita Saito, Iwata (JP); Yuji Hayashi, Toyohashi (JP)

(73) Assignee: Denso Corporation, Kariya (JP)

( * ) Notice: Subject to any disclaimer, the term of this patent is extended or adjusted under 35 U.S.C. 154(b) by 49 days.

(21) Appl. No.: 15/135,268

(22) Filed: Apr. 21, 2016

(65) Prior Publication Data
US 2016/0339875 A1    Nov. 24, 2016

(30) Foreign Application Priority Data

May 20, 2015  (JP) ................................ 2015-102974
May 20, 2015  (JP) ................................ 2015-102975
(Continued)

(51) Int. Cl.
*B60S 1/48* (2006.01)
*B60S 1/52* (2006.01)
(Continued)

(52) U.S. Cl.
CPC ................ *B60S 1/522* (2013.01); *B60S 1/56* (2013.01); *G02B 27/0006* (2013.01)

(58) Field of Classification Search
CPC ........... B60S 1/522; B60S 1/56; G02B 27/006
See application file for complete search history.

(56) References Cited

U.S. PATENT DOCUMENTS 3,237,866 A * 3/1966 Lovell .................... B60S 1/482
                                                                222/490
4,509,904 A * 4/1985 MacAskill .......... F04B 11/0041
                                                                417/568
(Continued)

FOREIGN PATENT DOCUMENTS

CN          1928363 A      3/2007
EP          2 845 773 A1   3/2015
(Continued)

*Primary Examiner* — Michael E Barr
*Assistant Examiner* — Benjamin L Osterhout
(74) *Attorney, Agent, or Firm* — Patterson Thuente Pedersen, P.A.

(57) ABSTRACT

The on-vehicle optical sensor cleaning system includes a washer pump that feeds a cleaning liquid, an air pump, a nozzle member, and a controller. The air pump includes a discharge valve and discharges air through the discharge valve. The discharge valve opens when air is compressed in the air pump. The nozzle member includes an ejection port that ejects a gas-liquid mixture toward a sensing surface of an on-vehicle optical sensor to remove foreign matter from the sensing surface. The cleaning liquid from the washer pump and the air from the air pump are mixed in the gas-liquid mixture. The controller controls the washer pump and the air pump. The controller is configured so that the gas-liquid mixture is ejected by storing the cleaning liquid in the nozzle member to cover the ejection port and then feeding the air to the nozzle member.

18 Claims, 20 Drawing Sheets

US 10,252,703 B2
Page 2

(30) Foreign Application Priority Data

| | | |
|---|---|---|
| May 28, 2015 | (JP) | 2015-109129 |
| May 28, 2015 | (JP) | 2015-109130 |
| Jan. 18, 2016 | (JP) | 2016-007324 |
| Jan. 19, 2016 | (JP) | 2016-007982 |

(51) Int. Cl.
*B60S 1/56* (2006.01)
*G02B 27/00* (2006.01)

(56) References Cited

U.S. PATENT DOCUMENTS

| | | | |
|---|---|---|---|
| 5,163,619 A * | 11/1992 | Wada | B60S 1/52 239/284.1 |
| 6,439,104 B1 | 8/2002 | Tonogai et al. | |
| 9,126,534 B2 * | 9/2015 | Snider | B60R 1/00 |
| 9,452,739 B2 * | 9/2016 | Kikuta | B60S 1/52 |
| 9,505,382 B2 * | 11/2016 | Gokan | B60S 1/0848 |
| 9,539,988 B2 * | 1/2017 | Hsiao | B60S 1/0862 |
| 9,604,601 B2 * | 3/2017 | Hsiao | B60S 1/566 |
| 9,746,666 B2 * | 8/2017 | Eineren | G02B 27/0006 |
| 9,796,361 B2 * | 10/2017 | Gokan | B60S 1/52 |
| 9,855,817 B2 * | 1/2018 | Hsiao | B60H 1/00392 |
| 9,910,272 B2 * | 3/2018 | Witte | G02B 27/0006 |
| 2002/0005440 A1 * | 1/2002 | Holt | B05B 7/08 239/284.2 |
| 2009/0250533 A1 * | 10/2009 | Akiyama | B60S 1/381 239/284.1 |
| 2011/0073142 A1 * | 3/2011 | Hattori | B60S 1/0848 134/56 R |
| 2011/0292212 A1 | 12/2011 | Tanabe et al. | |
| 2013/0092758 A1 * | 4/2013 | Tanaka | B60S 1/52 239/284.1 |
| 2014/0060582 A1 | 3/2014 | Hartranft et al. | |
| 2014/0174744 A1 | 6/2014 | Boone et al. | |
| 2015/0040953 A1 | 2/2015 | Kikuta et al. | |
| 2015/0078940 A1 | 3/2015 | Kikuta et al. | |
| 2015/0138357 A1 * | 5/2015 | Romack | G02B 27/0006 348/148 |
| 2015/0151722 A1 * | 6/2015 | Gokan | B60S 1/50 134/102.2 |
| 2015/0343999 A1 | 12/2015 | Lopez Galera et al. | |

FOREIGN PATENT DOCUMENTS

| | | | |
|---|---|---|---|
| JP | 2001041159 A | 2/2001 | |
| JP | 2001171491 A | 6/2001 | |
| JP | 2002-168175 A | 6/2002 | |
| JP | 2012-175359 A | 9/2012 | |
| JP | WO 2014010579 A1 * | 1/2014 | B05B 1/267 |
| JP | 2015057338 A | 3/2015 | |
| JP | 2015083830 A | 4/2015 | |
| JP | 2015224032 A | 12/2015 | |
| JP | 2016-599 A | 1/2016 | |

* cited by examiner

Fig.9A
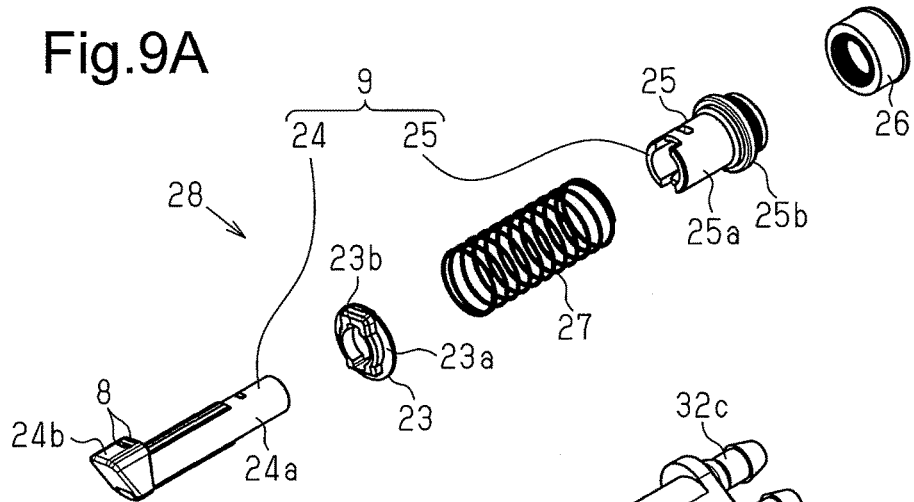
Fig.9B
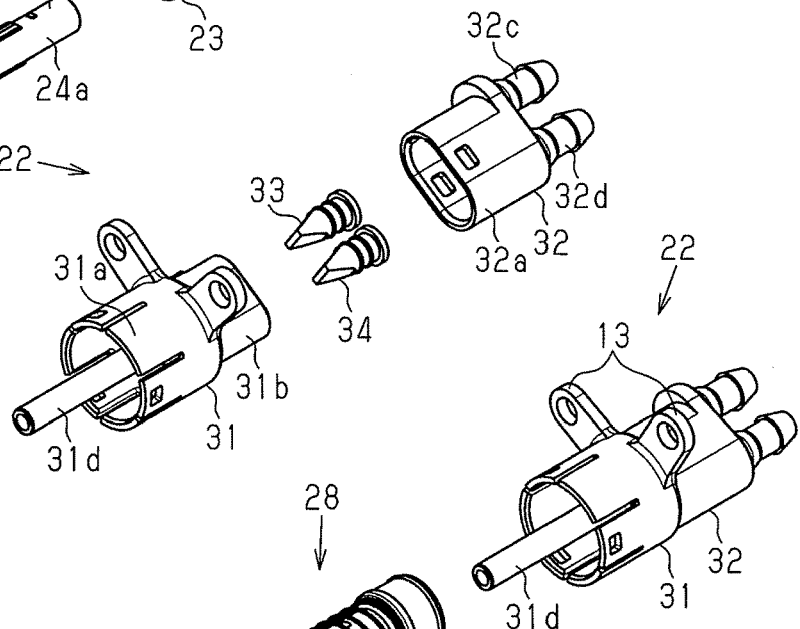
Fig.9C
Fig.9D
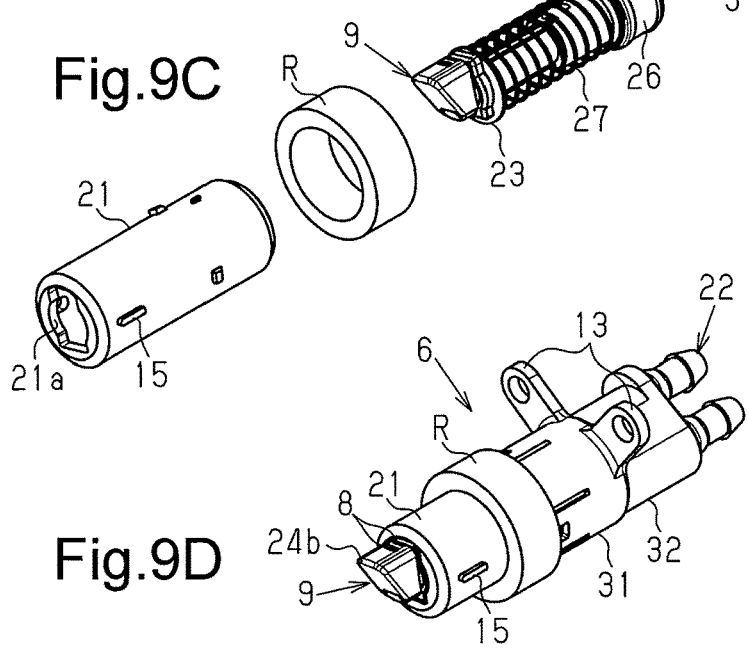

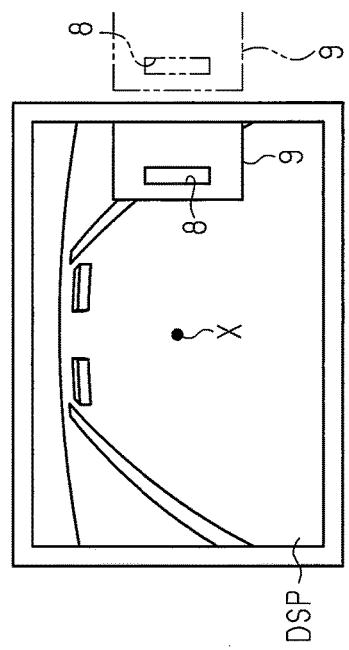
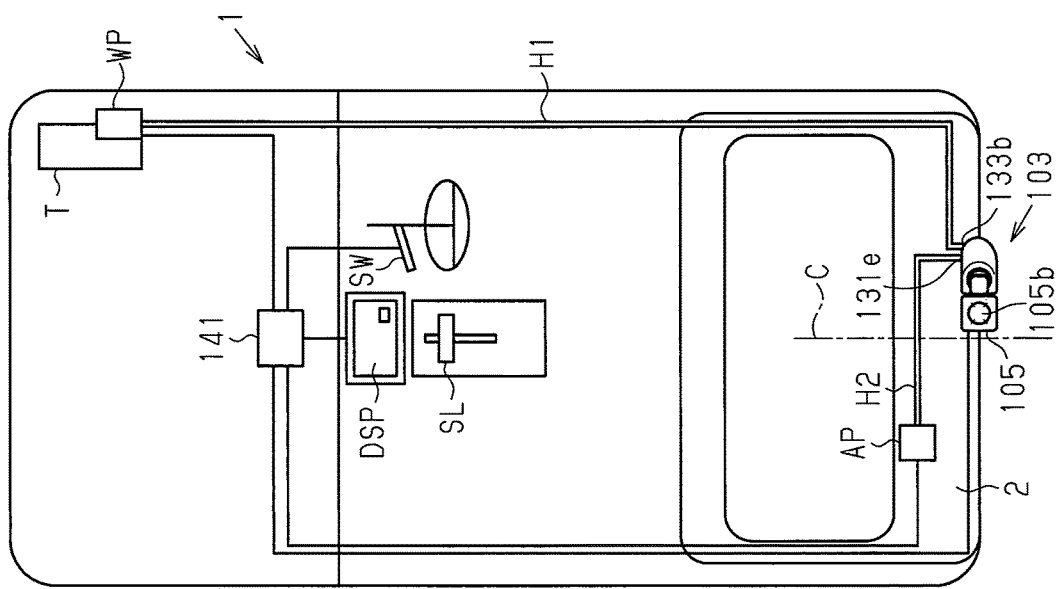

SYSTEM FOR CLEANING ON-VEHICLE OPTICAL SENSOR AND METHOD FOR THE SAME

BACKGROUND

The present invention relates to a system for cleaning an on-vehicle optical sensor and a method for cleaning an on-vehicle optical sensor.

Recent vehicles often include on-vehicle optical sensors at the front or rear to use the images captured by the on-vehicle optical sensors. Foreign matter such as mud may collect on a sensing surface (e.g., lens or protection glass) of an on-vehicle optical sensor. Thus, for example, Japanese Laid-Open Patent Publication No. 2001-171491 proposes an on-vehicle optical sensor cleaning system that ejects water and air having high pressure (water/compressed air) from a nozzle toward the sensing surface to remove the foreign matter.

Although the on-vehicle optical sensor cleaning system such as that described above uses a compressed air generating unit, there is no specific mention of how high-pressure cleaning liquid (water) is ejected. There is a demand for a technique for ejecting the cleaning liquid under higher pressure to increase the cleaning effect.

SUMMARY

It is an object of the present invention to provide an on-vehicle optical sensor cleaning system and an on-vehicle optical sensor cleaning method that are capable of ejecting a gas-liquid mixture, in which a cleaning liquid and air are mixed, under higher pressure.

To achieve the above object, one aspect of the present invention is an on-vehicle optical sensor cleaning system that includes a washer pump that feeds a cleaning liquid, an air pump, a nozzle member, and a controller. The air pump includes a discharge valve and discharges air through the discharge valve. The discharge valve opens when air is compressed in the air pump. The nozzle member includes an ejection port that ejects a gas-liquid mixture toward a sensing surface of an on-vehicle optical sensor to remove foreign matter from the sensing surface. The cleaning liquid from the washer pump and the air from the air pump are mixed in the gas-liquid mixture. The controller controls the washer pump and the air pump. The controller is configured so that the gas-liquid mixture is ejected by storing the cleaning liquid in the nozzle member to cover the ejection port and then feeding the air to the nozzle member.

Another aspect of the present invention is a method for cleaning an on-vehicle optical sensor that ejects a gas-liquid mixture in which a cleaning liquid and air are mixed toward a sensing surface of the on-vehicle optical sensor to remove foreign matter from the sensing surface. The method includes storing a cleaning liquid in a nozzle member to cover an ejection port of the nozzle member, and then feeding air to the nozzle member to eject the gas-liquid mixture.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 9A is an exploded perspective view of a piston unit;

FIG. 9B is an exploded perspective view of an intake housing member;

FIG. 9C is an exploded perspective view of a nozzle unit;

FIG. 9D is a perspective view of the nozzle unit;

FIG. 17A is a schematic diagram showing the structure of a second embodiment of a vehicle according to the present invention;

FIG. 17B is a schematic view of the display shown in FIG. 17A;

DESCRIPTION OF THE EMBODIMENTS

A first embodiment of a vehicle will now be described with reference to FIGS. 1 to 14.

Figure 1B:
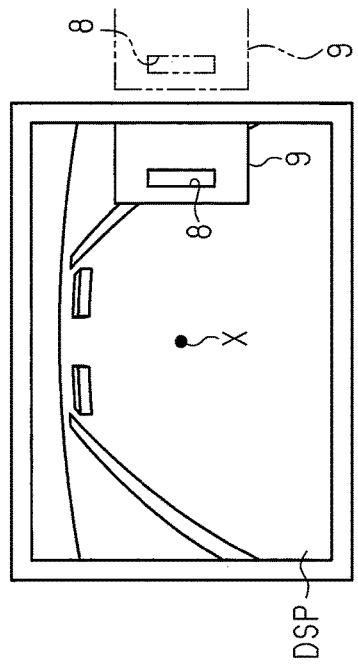
FIG. 1B is a schematic view of the display shown in FIG. 1A.
Figure 1A:
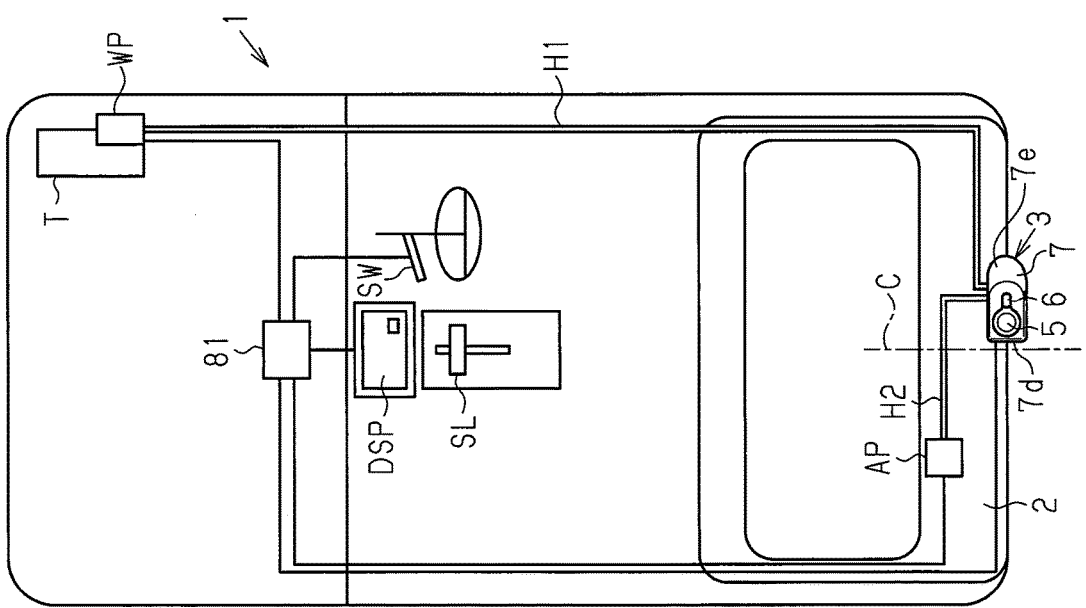
FIG. 1A is a schematic diagram showing the structure of a first embodiment of a vehicle according to the present invention.

As shown in FIG. 1A, a rear door 2 is located on the rear of a vehicle 1, and an on-vehicle optical sensor unit 3 is arranged on the rear door 2. The on-vehicle optical sensor unit 3 of the first embodiment is fixed to a position located slightly toward a driver seat side (right side) from a lateral center line C of the vehicle 1.

As shown in FIGS. 2 to 5, the on-vehicle optical sensor unit 3 includes an on-vehicle camera 5, which functions as an on-vehicle optical sensor, a nozzle unit 6, which functions as an on-vehicle optical sensor cleaning device, and an on-vehicle optical sensor attachment bracket 7.

Figure 2:
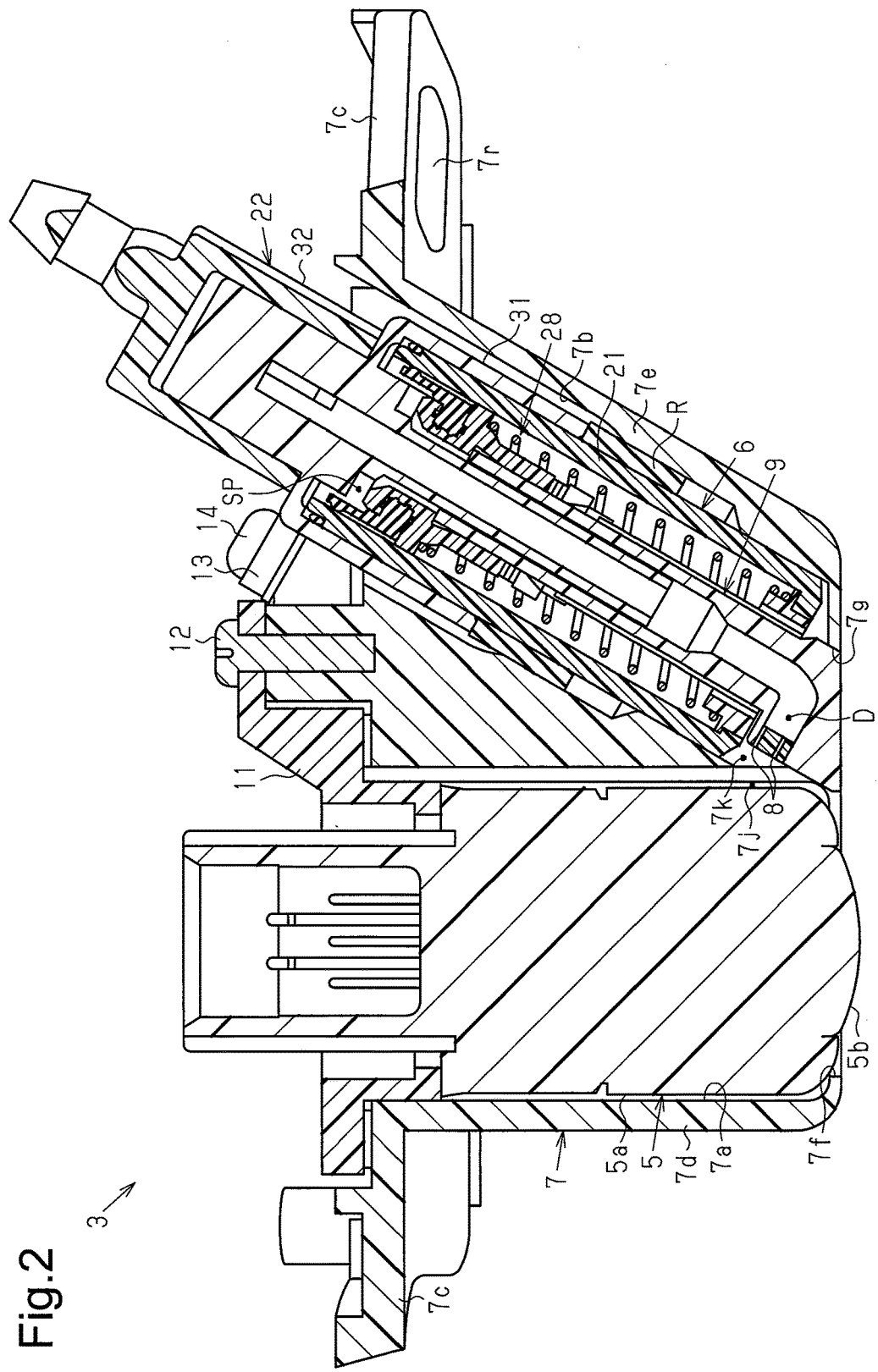
FIG. 2 is a cross-sectional view of the on-vehicle optical sensor unit shown in FIG. 1A.

As shown in FIG. 2, the on-vehicle camera 5 includes a cuboid body 5a, which accommodates an image capturing element (not shown), and a lens 5b, which is located on one surface of the body 5a and functions as a sensing surface (external image capturing surface).

As shown in FIGS. 1A and 1B, for example, when a shift lever SL of a gearshift device is operated to a reverse position, the on-vehicle camera 5 transmits a captured image of a rear side of the vehicle 1 to an in-vehicle display DSP to show the image. The on-vehicle camera 5 is fixed to the rear door 2 by the on-vehicle optical sensor attachment bracket 7 so that the lens 5b faces obliquely downward to capture an oblique downward image of the rear side of the vehicle 1.

As shown in FIGS. 2, 9D, 10, and 11, the entire contour of the nozzle unit 6 is cylindrical. The nozzle unit 6 includes a nozzle member 9 including ejection ports 8. When moved from a non-cleaning position (refer to FIGS. 2 and 10) to a cleaning position (refer to FIG. 11), the nozzle member 9 projects outward and ejects a fluid from the ejection ports 8 toward the lens 5b (refer to FIG. 2). In the present embodiment, the fluid is one of a cleaning liquid, air, and a gas-liquid mixture.

As shown in FIG. 2, the on-vehicle optical sensor attachment bracket 7 is integrally formed by a sensor receptacle 7a, which accommodates the on-vehicle camera 5 and exposes the lens 5b to the exterior, a nozzle receptacle 7b, which accommodates the nozzle unit 6, and a vehicle fastening portion 7c.

More specifically, the on-vehicle optical sensor attachment bracket 7 includes a tetragonal tube 7d that includes an interior defining the sensor receptacle 7a, which accommodates the cuboid on-vehicle camera 5, and a circular tube 7e that includes an interior defining the nozzle receptacle 7b, which accommodates the cylindrical nozzle unit 6. The tetragonal tube 7d and the circular tube 7e are located beside each other with side walls joined together. More specifically, the tetragonal tube 7d includes a distal portion provided with a circular exposure bore 7f that exposes the lens 5b of the on-vehicle camera 5 to the exterior and a basal portion that opens to receive the on-vehicle camera 5. The circular tube 7e includes a distal portion provided with a nozzle bore 7g that is continuous with the exposure bore 7f and allows the nozzle member 9 to move frontward and rearward and a basal portion that opens to receive the nozzle unit 6. The circular tube 7e is inclined relative to the tetragonal tube 7d so that the circular tube 7e is located closer to the tetragonal tube 7d as extending toward the distal side. The circular tube 7e (nozzle receptacle 7b) is located at a driver seat side (right side) of the tetragonal tube 7d (sensor receptacle 7a) in the lateral direction of the vehicle 1 (refer to FIG. 1A).

Figure 5:
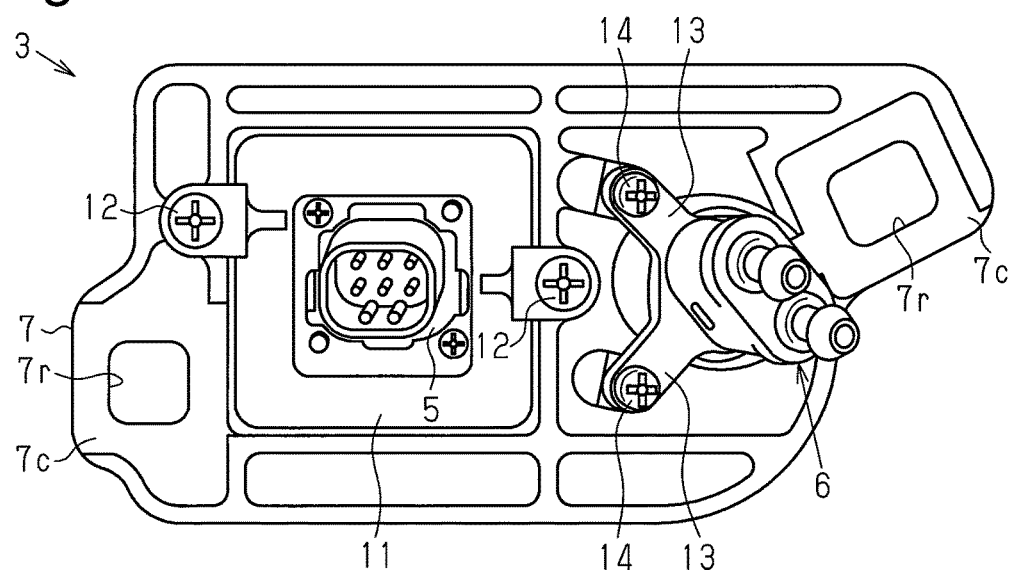
FIG. 5 is a rear view of the on-vehicle optical sensor unit shown in FIG. 3.

As shown in FIGS. 2 and 5, a fastening member 11 is fastened to the on-vehicle optical sensor attachment bracket 7 by screws 12. The on-vehicle camera 5, which is accommodated in the sensor receptacle 7a, includes a rear end that engages with the fastening member 11. This prevents removal of the on-vehicle camera 5 from the sensor receptacle 7a and fixes the on-vehicle camera 5 to the on-vehicle optical sensor attachment bracket 7.

The nozzle unit 6, which is accommodated in the nozzle receptacle 7b, includes fastening portions 13 that project out of the nozzle receptacle 7b. The fastening portions 13 are fastened to the on-vehicle optical sensor attachment bracket 7 by screws 14. This prevents removal of the nozzle unit 6 from the nozzle receptacle 7b.

As shown in FIG. 2, the on-vehicle optical sensor attachment bracket 7 of the present embodiment includes liquid release portions 7j, 7k at locations corresponding to the ejection ports 8 of the nozzle member 9 when located at the non-cleaning position. The liquid release portions 7j, 7k are cavities capable of receiving the cleaning liquid leaked from the ejection ports 8. The sensor receptacle 7a and the nozzle receptacle 7b are in communication with each other, that is, a partition wall is not formed, at locations corresponding to the ejection ports 8. This forms the liquid release portions 7j, 7k in the sensor receptacle 7a and the nozzle receptacle 7b. More specifically, when the cleaning liquid is leaked from the ejection ports 8 of the nozzle member 9 when located at the non-cleaning position, the cleaning liquid may flow into the liquid release portions 7j, 7k, which are formed in the sensor receptacle 7a and the nozzle receptacle 7b.

Figure 6:
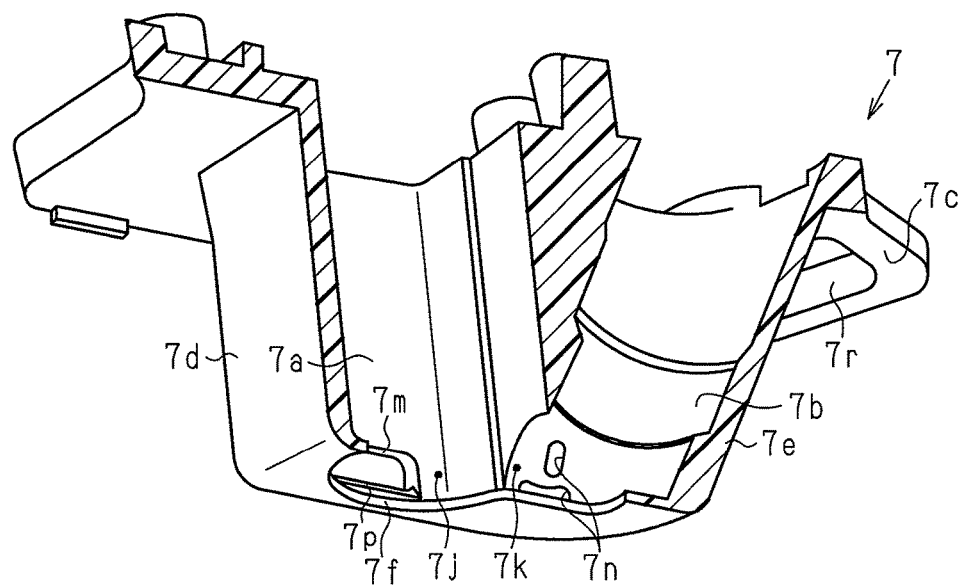
FIG. 6 is a perspective cross-sectional view of the on-vehicle optical sensor attachment bracket shown in FIG. 3.
Figure 7:
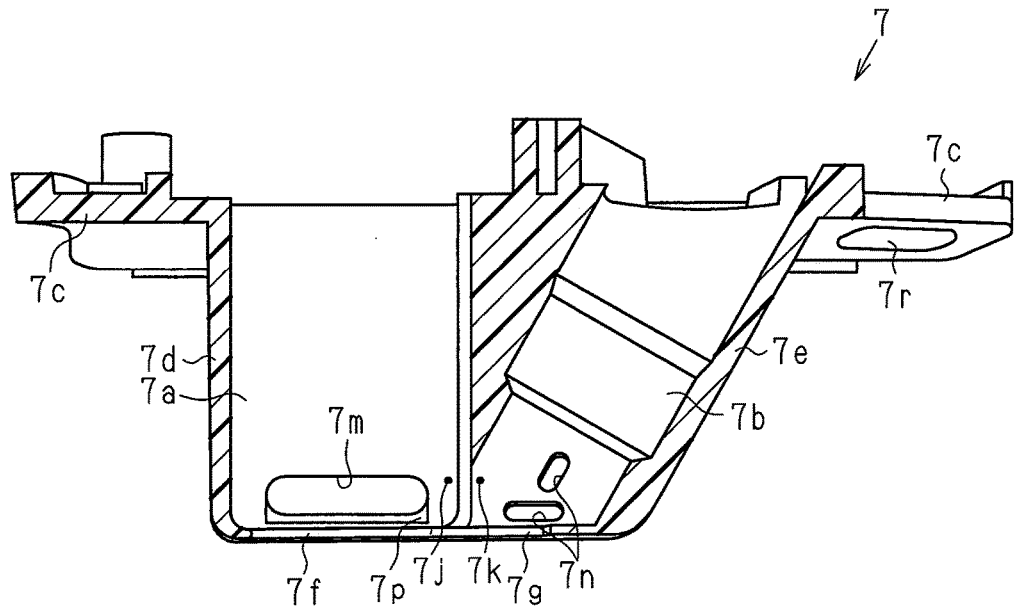
FIG. 7 is a cross-sectional view showing a lower portion of the on-vehicle optical sensor attachment bracket shown in FIG. 6.

As shown in FIGS. 6 and 7, the liquid release portions 7j, 7k are provided with discharge bores 7m, 7n that open in directions different from the exposure bore 7f (lens 5b). In the present embodiment, the discharge bores 7m, 7n are open in the gravitational direction (downward). In the present embodiment, the discharge bore 7m corresponds to the liquid release portion 7j of the sensor receptacle 7a, and the discharge bores 7n correspond to the liquid release portion 7k of the nozzle receptacle 7b.

As shown in FIGS. 6 and 7, the discharge bore 7m of the sensor receptacle 7a includes an inner rim including an inclined surface 7p at a location corresponding to a distal end of the on-vehicle camera 5. The inclined surface 7p enlarges a gap (i.e., liquid release portion 7j) between the on-vehicle camera 5 and the on-vehicle optical sensor attachment bracket 7 and guides the cleaning liquid, which is leaked into the liquid release portion 7j, to the discharge bore 7m.

Figure 3:
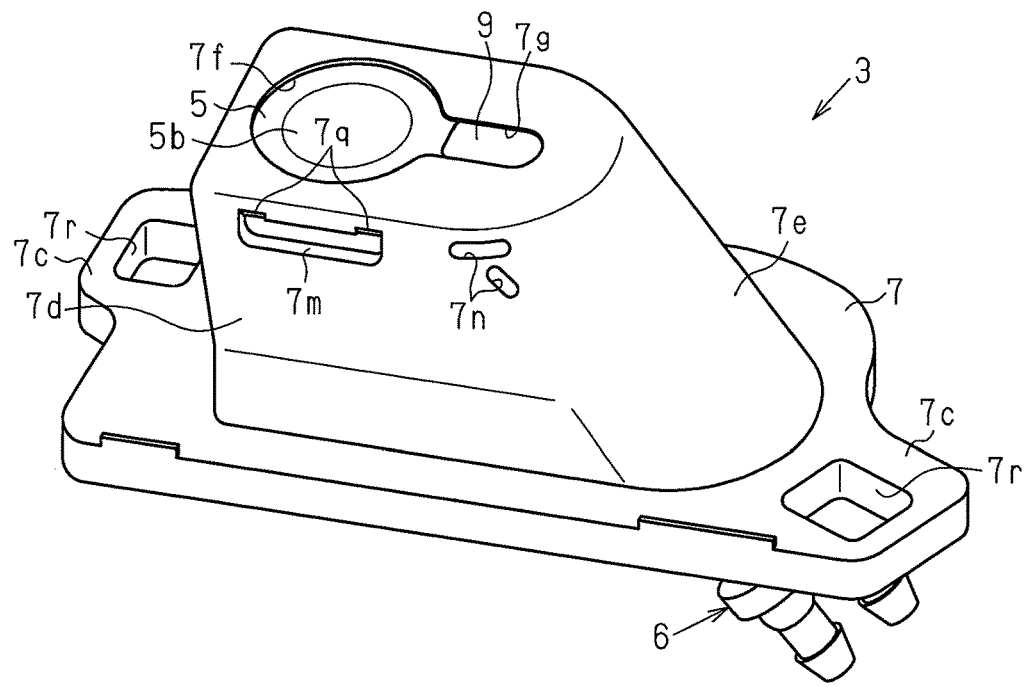
FIG. 3 is a perspective view of the on-vehicle optical sensor unit shown in FIG. 1A.
Figure 4:
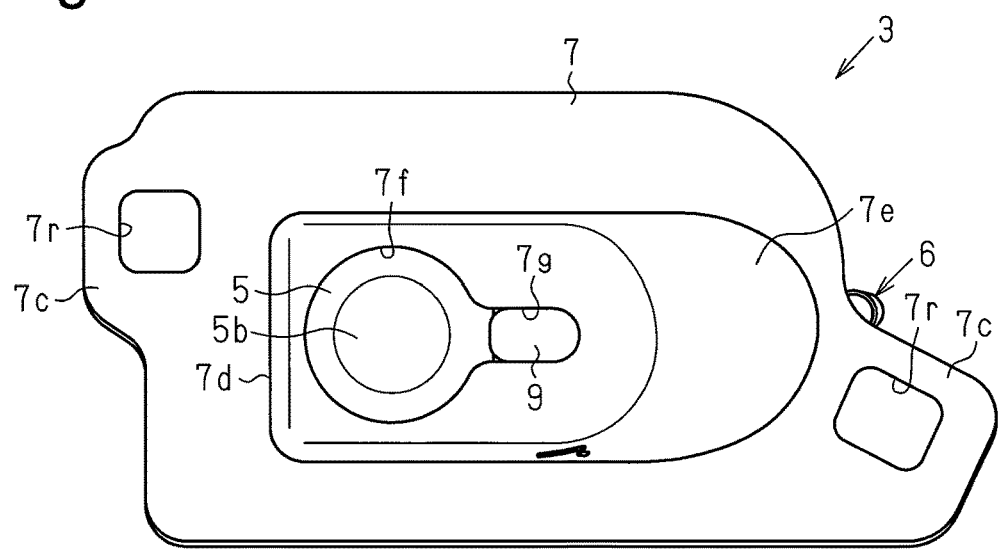
FIG. 4 is a front view of the on-vehicle optical sensor unit shown in FIG. 3.

As shown in FIG. 3, the discharge bore 7m of the sensor receptacle 7a includes an outer rim including inclined surfaces 7q on two ends at locations corresponding to the distal end of the on-vehicle camera 5. The inclined surfaces 7q facilitate discharging of the cleaning liquid, which is guided to the discharge bore 7m in the liquid release portion 7j, out of the sensor receptacle 7a from the discharge bore 7m. The inclined surfaces 7q are arranged to extend in the gravitational direction.

Figure 8:
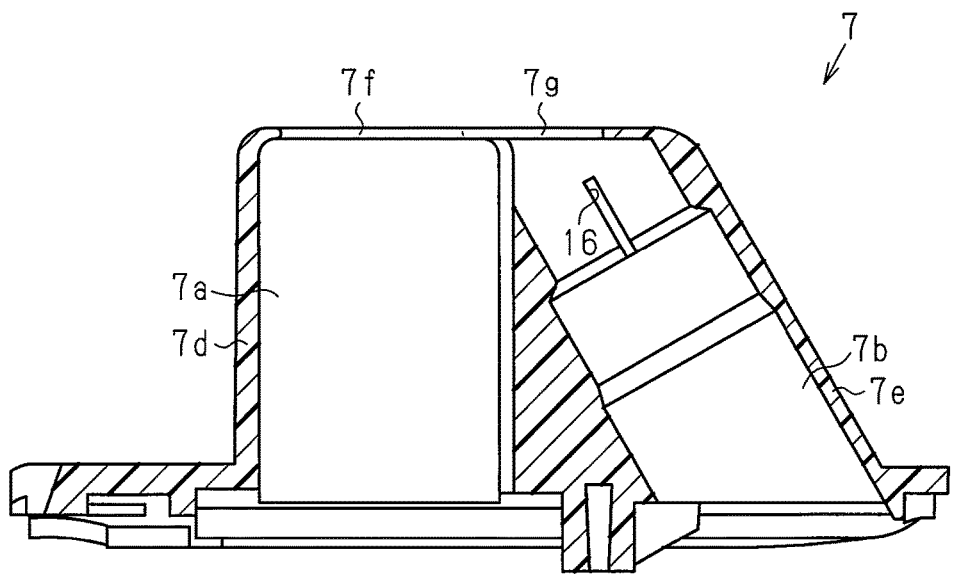
FIG. 8 is a cross-sectional view showing an upper portion of the on-vehicle optical sensor attachment bracket shown in FIG. 6.

As shown in FIG. 8, the nozzle receptacle 7b includes an upper portion including a rotation restricting portion 16. The rotation restricting portion 16 is a groove that engages with a projected rotation restricted portion 15 (refer to FIG. 9D), which will be described later, in a circumferential direction.

The vehicle fastening portion 7c is flange-shaped and projects from the basal portions of the tetragonal tube 7d and the circular tube 7e. The vehicle fastening portion 7c is provided with fastening holes 7r and fastened to the vehicle 1 by fastening pins (not shown) when inserted through the fastening holes 7r.

As shown in FIGS. 2 and 9 to 11, the nozzle unit 6 includes an elongated tubular cylinder housing 21, a piston unit 28, and an intake housing member 22.

As shown in FIGS. 9C and 9D, the cylinder housing 21 has the form of an elongated tube and includes an outer circumferential surface. The rotation restricted portion 15 projects from the outer circumferential surface and engages with the rotation restricting portion 16 (refer to FIG. 8) in the circumferential direction. Additionally, a tubular elastic member R is fitted onto the outer circumference of the cylinder housing 21. When accommodated in the nozzle receptacle 7b, the cylinder housing 21 is in press contact with an inner surface of the nozzle receptacle 7b with the elastic member R located in between. Additionally, a holder support 21a extends radially inward from a distal portion of the cylinder housing 21 and engages with a spring holder 23 (refer to FIGS. 2, 9A, and 9C), which will be described later.

Figure 10:
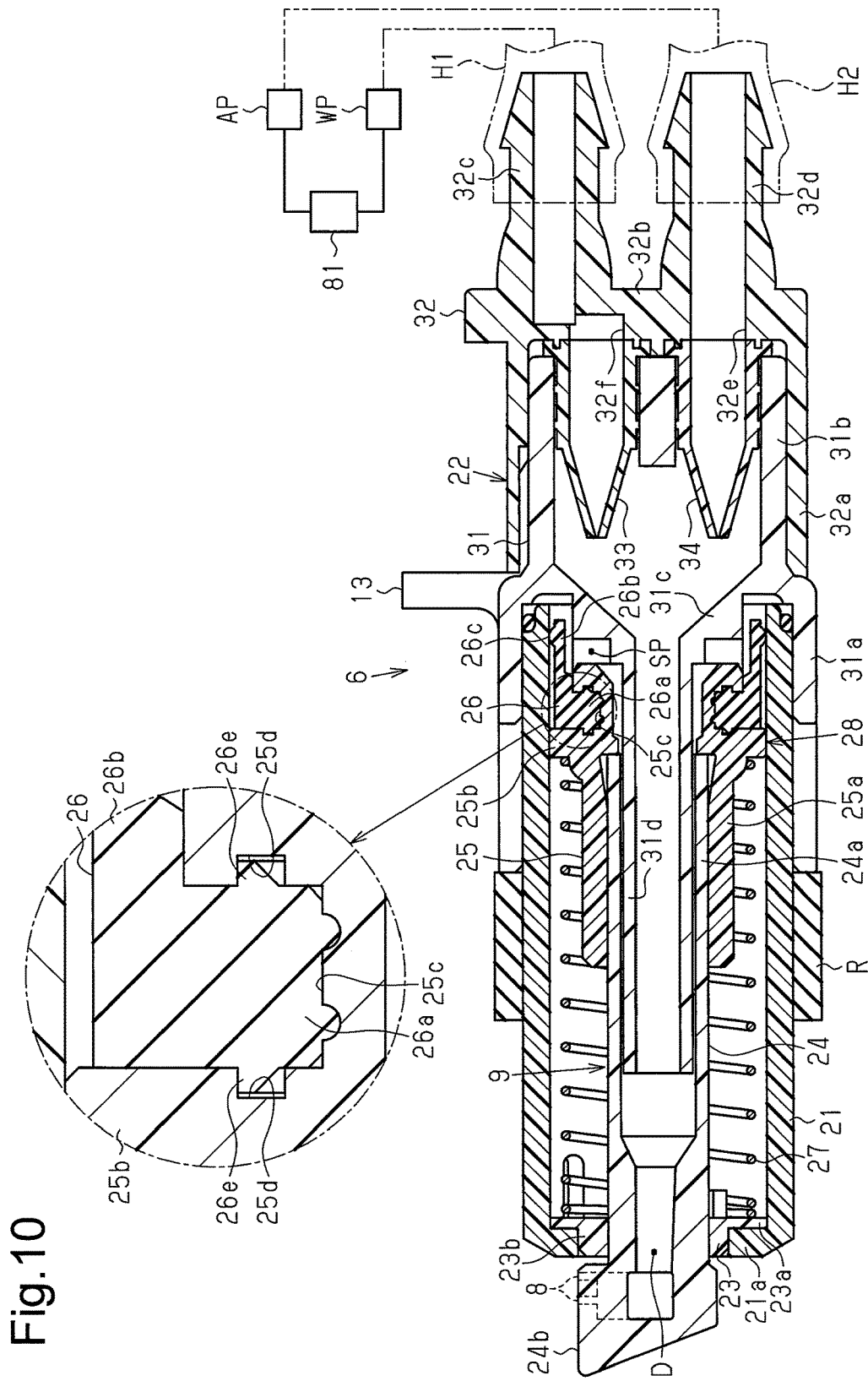
FIG. 10 is a cross-sectional view of the nozzle unit arranged in a non-cleaning position.
Figure 11:
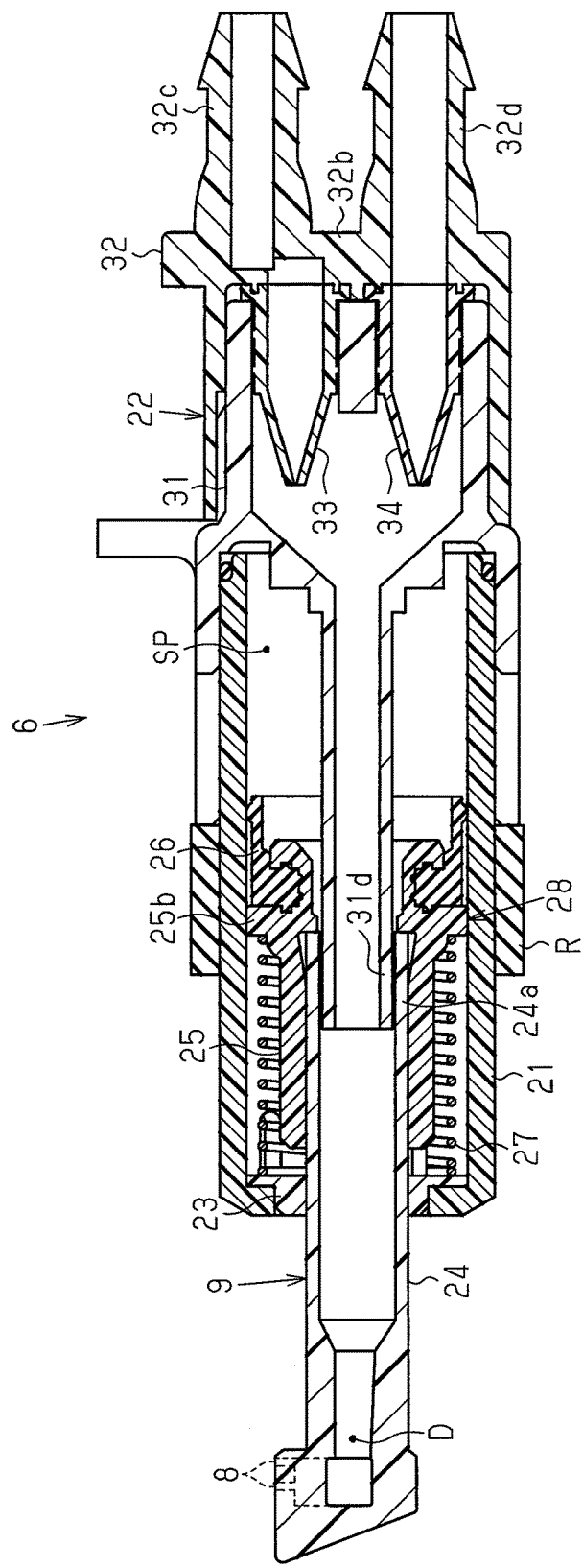
FIG. 11 is a cross-sectional view showing the operation of the nozzle unit.

As shown in FIGS. 9A and 10, the piston unit 28 includes the nozzle member 9 and a compression coil spring 27. The nozzle member 9 includes a piston nozzle member 24 and a flange member 25. The piston nozzle member 24 includes an elongated tube 24a and a nozzle 24b. The nozzle 24b is bulged from a distal portion of the tube 24a to a radially outer side. The nozzle 24b includes a distal end that defines the ejection ports 8. The flange member 25 is fixed to a basal end of the piston nozzle 24. In the present embodiment, the piston nozzle member 24 of the nozzle member 9 includes a distal interior (interior of ejection ports 8) defining a common intake chamber D capable of drawing in the cleaning liquid and air. The flange member 25 includes an outer fitting tube 25a, which is fitted onto a basal portion of the tube 24a, and a basal flange 25b, which projects radially outward from a basal portion of the outer fitting tube 25a.

As shown in FIG. 10, the basal flange 25b includes a packing fitting recess 25c that extends throughout the circumference and opens radially outward. A lip packing 26 is fitted to the packing fitting recess 25c. The lip packing 26 includes an annular fitting portion 26a, a lip portion 26b, and an annular slide portion 26c. The fitting portion 26a is fitted to the packing fitting recess 25c. The lip portion 26b axially extends from a radially outer end of the fitting portion 26a toward the basal side. The slide portion 26c projects from a distal outer circumferential surface of the lip portion 26b and has an arc-shaped cross section. The slide portion 26c slides on an inner circumferential surface of the cylinder housing 21. Additionally, the packing fitting recess 25c of the present embodiment includes separation restriction grooves 25d that axially extend. The separation restriction grooves 25d of the present embodiment annually extend in two axial surfaces of the packing fitting recess 25c along the packing fitting recess 25c. The fitting portion 26a of the lip packing 26 includes a pair of separation restriction projections 26e, which are fitted to the separation restriction grooves 25d.

The piston unit 28 includes the nozzle member 9, the spring holder 23 coupled to the nozzle member 9, and the compression coil spring 27. The spring holder 23, which is fitted onto the tube 24a, allows axial sliding of the tube 24a and restricts relative axial rotation of the tube 24a. The compression coil spring 27 is fitted onto the tube 24a and held in a compressed state between the spring holder 23 and the basal flange 25b. More specifically, the piston unit 28 is formed by fitting the spring holder 23 and the compression coil spring 27 onto the piston nozzle member 24 from a basal end of the tube 24a and then fitting the outer fitting tube 25a of the flange member 25 onto the basal portion of the tube 24a.

The cylinder housing 21 is configured to accommodate the piston unit 28. When coupling the piston unit 28, which has been assembled, the piston unit 28 is inserted into the cylinder housing 21 from a basal end of the cylinder housing 21. The nozzle 24b projects out of the distal portion of the cylinder housing 21. The spring holder 23 engages with the holder support 21a located on the distal portion of the cylinder housing 21 to restrict further movement of the spring holder 23. As shown in FIGS. 9A and 10, the spring holder 23 includes a discoid portion 23a having a larger diameter than the holder support 21a located on the distal portion of the cylinder housing 21. This restricts removal of the spring holder 23 from the distal portion of the cylinder housing 21. The spring holder 23 includes an engagement portion 23b that is fitted in the holder support 21a and circumferentially engaged with the holder support 21a. This restricts rotation of the spring holder 23 relative to the cylinder housing 21. The above arrangement allows the nozzle member 9 to move frontward and rearward while accommodated in the cylinder housing 21. When the basal flange 25b is urged toward the ejection ports 8 by feeding pressure of a fluid, the nozzle member 9 moves frontward against the urging force of the compression coil spring 27 to the cleaning position (refer to FIG. 11). When the feeding pressure is not applied, the nozzle member 9 moves rearward to the non-cleaning position due to the urging force of the compression coil spring 27.

The intake housing member 22 is coupled to a basal portion of the cylinder housing 21.

As shown in FIGS. 9B and 10, the intake housing member 22 includes an inlet member 31, an intake member 32, a cleaning-liquid-side check valve 33, and an air-side check valve 34.

The inlet member 31 includes a tubular outer fitting portion 31a, a basal flow passage 31b, an inner extension 31c, and a tubular inlet 31d. The outer fitting portion 31a is fitted onto the basal portion of the cylinder housing 21. The basal flow passage 31b axially extends from a basal part of the outer fitting portion 31a. The inner extension 31c inwardly extends from the basal part of the outer fitting portion 31a. The inlet 31d extends from the inner extension 31c to a side opposite to the basal flow passage 31b. The basal flow passage 31b has the form of an oblong tube formed by parallel lines and arcs connected to the parallel lines as viewed in the extension direction (axial direction). As shown in FIG. 10, the inner extension 31c is inclined to part from the basal flow passage 31b as extending inward. The cylinder housing 21 is provided with space SP between the inner extension 31c and the basal flange 25b. The outer diameter of the inlet 31d is set slightly smaller than the inner diameter of the tube 24a so that the inlet 31d is loosely fitted to an inner surface of the tube 24a when inserted from the basal end of the nozzle member 9. The basal part of the outer fitting portion 31a of the inlet member 31 includes the fastening portions 13 (refer to FIG. 5), which are fastened to the on-vehicle optical sensor attachment bracket 7 by the screws 14.

The intake member 32 includes an outer fitting portion 32a, a tubular cleaning liquid intake passage 32c, and an air intake passage 32d. The outer fitting portion 32a is fitted onto the basal flow passage 31b of the inlet member 31 and includes a basal closed end 32b. The cleaning liquid intake passage 32c and the air intake passage 32d extend from the closed end 32b parallel to the axial direction. More specifically, the outer fitting portion 32a has the form of an oblong tube in conformance with the oblong tubular basal flow passage 31b and may be fitted onto the basal flow passage 31b. The closed end 32b has the form of an oblong disc. The closed end 32b is provided with an air-side through portion 32e at a location corresponding to the axial center of one of the arcs of the basal flow passage 31b. The air intake passage 32*d* is in linear communication with the air-side through portion 32*e*. Additionally, the closed end 32*b* is provided with a cleaning-liquid-side through portion 32*f* at a location corresponding to the axial center of the other arc of the basal flow passage 31*b*. The cleaning liquid intake passage 32*c* is displaced toward an outer side of the cleaning-liquid-side through portion 32*f* (in FIG. 10, side opposite to air intake passage 32*d*) and in communication with the cleaning-liquid-side through portion 32*f*. Thus, while the distance between the cleaning liquid intake passage 32*c* and the air intake passage 32*d* is long enough to connect a cleaning liquid hose H1 and an air hose H2, the distance between the cleaning-liquid-side through portion 32*f* and the air-side through portion 32*e* is short. This reduces the size of the basal flow passage 31*b* of the inlet member 31 and the outer fitting portion 32*a* of the intake member 32. The cleaning-liquid-side check valve 33 is located at a position that communicates to the cleaning-liquid-side through portion 32*f* in the basal flow passage 31*b* of the inlet member 31 between the cleaning liquid intake passage 32*c* and the common intake chamber D. The air-side check valve 34 is located at a position that communicates to the air-side through portion 32*e* in the basal flow passage 31*b* of the inlet member 31 between the air intake passage 32*d* and the common intake chamber D. Each of the cleaning-liquid-side check valve 33 and the air-side check valve 34 of the present embodiment is of a duckbill-type and includes a downstream portion (portion located toward common intake chamber D) having a squeezed opening. This allows for a downstream flow of a fluid and blocks an upstream flow of the fluid.

As shown in FIG. 10, the cleaning liquid intake passage 32*c* is connected to a washer pump WP by the cleaning liquid hose H1. The air intake passage 32*d* is connected to an air pump AP by the air hose H2.

As shown in FIG. 1A, the washer pump WP is capable of feeding the cleaning liquid, which is a fluid stored in a tank T. When an internal pump motor (not show) is driven, the cleaning liquid is fed to (drawn in) the nozzle unit 6 (more specifically, cleaning liquid intake passage 32*c*) through the cleaning liquid hose H1.

The air pump AP is capable of instantaneously discharging compressed high-pressure air. When driven, air is fed to (drawn in) the nozzle unit 6 (more specifically, air intake passage 32*d*) through the air hose H2.

Figure 12:
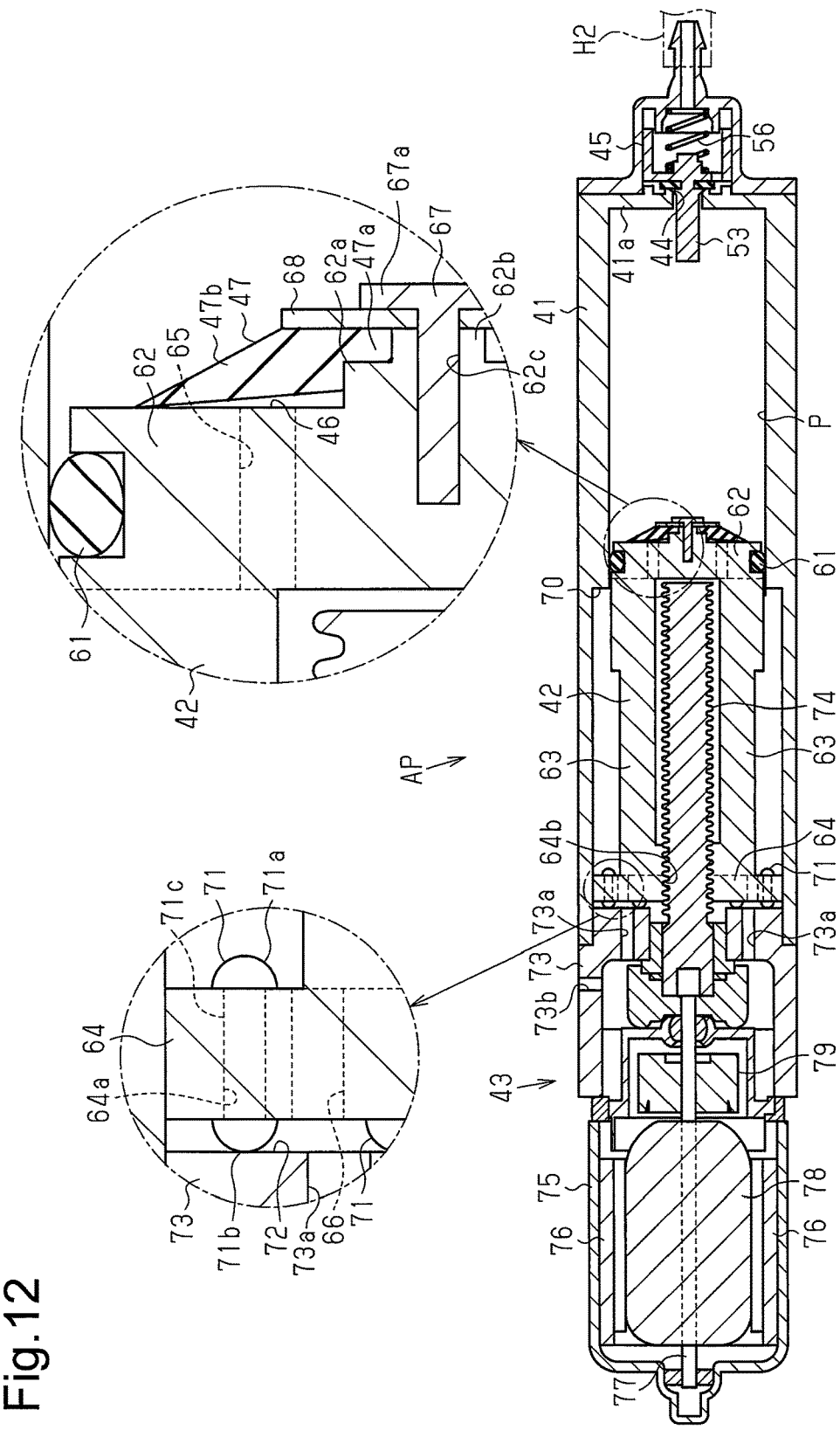
FIG. 12 is a cross-sectional view of an air pump.

As shown in FIG. 12, the air pump AP of the present embodiment is a positive displacement pump and discharges air having a fixed volume. The air pump AP includes an elongated tubular cylinder 41, a piston 42 movable forward and backward in the cylinder 41, and a motor 43 located at a backward movement side of the piston 42 (left side in FIG. 12). The motor 43 drives the piston 42 forward and backward.

Figure 13A:
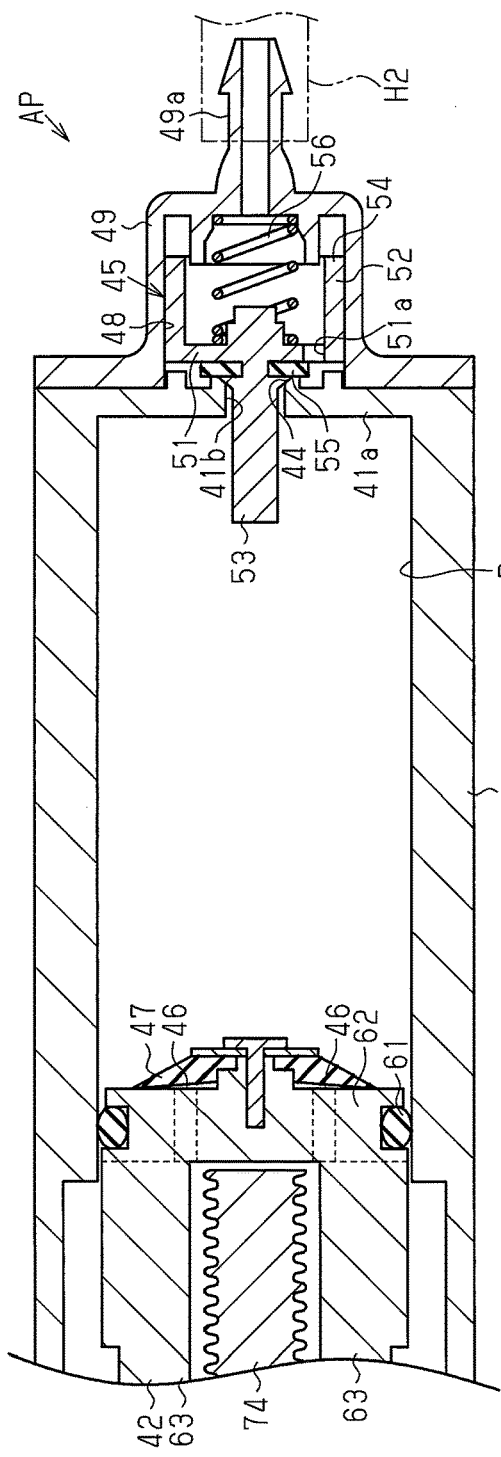
FIGS. 13A and 13B are partially enlarged cross-sectional views showing the operation of the air pump.
Figure 13B:
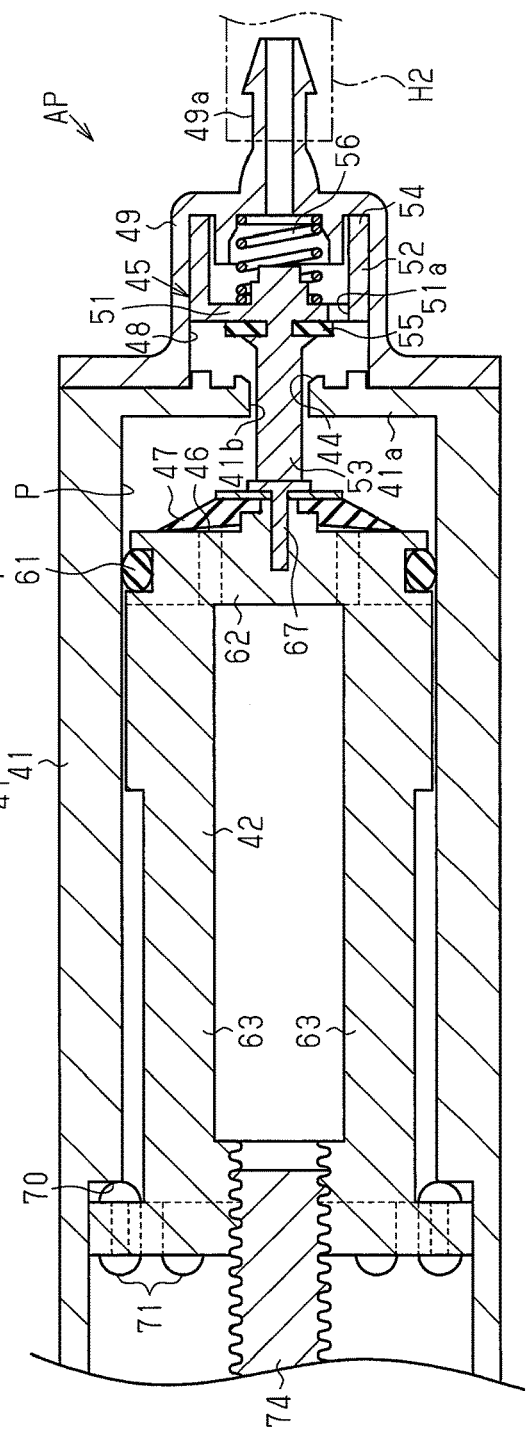

As shown in FIGS. 13A and 13B, the air pump AP includes a discharge valve 45 and a suction valve 47. The discharge valve 45 performs an opening operation and a closing operation to open and close a discharge valve port 44 that communicates inner and outer sides of the cylinder 41. The suction valve 47 performs an opening operation and a closing operation to open and close suction valve ports 46 that communicate inner and outer sides of the piston 42. The discharge valve 45 opens when the air is compressed in the air pump AP to predetermined pressure. More specifically, the piston 42 includes an operation member 67, which will be described later, and the discharge valve 45 includes an operation projection 53. When the operation member 67 pushes the operation projection 53, the discharge valve 45 opens. When the piston 42 moves forward to reduce space (pump chamber P) in the cylinder 41, the air is compressed in the cylinder 41. Subsequently, the discharge valve 45 opens and discharges the compressed air from the discharge valve port 44. When the piston 42 moves backward, the suction valve 47 opens and draws air into the cylinder 41 from the suction valve ports 46.

More specifically, the cylinder 41 is tubular and has a closed end defining a closed end 41*a* (right end in FIG. 13). The closed end 41*a* includes a central portion provided with a central hole 41*b*. The central hole 41*b* includes an outer opening defining the discharge valve port 44. The outer side of the closed end 41*a* of the cylinder 41 is fixed to a tubular valve housing 49 having a closed end. The valve housing 49 includes a valve chamber 48 that communicates to the discharge valve port 44. The closed end of the valve housing 49 is provided with a tubular air outlet passage 49*a* that projects and communicates to the valve chamber 48. The air outlet passage 49*a* is connected to the air hose H2.

The discharge valve 45 includes a discharge valve member 54 and a discoid rubber member 55. The discharge valve member 54 is integrally formed by a disc 51, a tube 52 and the operation projection 53. The disc 51 is shaped in conformance with an inner circumferential surface of the valve chamber 48. The tube 52 axially extends from a rim of the disc 51 (to right in FIG. 13) and guides the axial movement of the tube 52. The operation projection 53 projects from the center of the disc 51 to an inner side of the cylinder 41. The discoid rubber member 55 is fitted onto a basal portion of the operation projection 53. A discharge communication bore 51*a* axially extends through a part of a circumferential portion of the disc 51. The discharge valve 45 is movable in the forward-backward direction of the piston 42. The discharge valve 45 is capable of performing the closing operation in a direction in which the rubber member 55 closely contacts the discharge valve port 44, that is, closes the discharge valve port 44. The discharge valve 45 is also capable of performing the opening operation in a direction in which the rubber member 55 is separated from the discharge valve port 44, that is, opens the discharge valve port 44. The discharge valve 45 is urged to the inner side (left side in FIG. 13) of the cylinder 41 by a coil spring 56 supported on the closed end of the valve housing 49. The spring coefficient of the coil spring 56 or the like is set so that the discharge valve 45 will not perform the opening operation only by compressed air, which will be described later.

As shown in FIG. 12, the piston 42 includes a discoid piston body 62, two rods 63, and a discoid disc 64. A seal ring 61 is fitted onto the circumference of the piston body 62. The piston body 62 slides on the inner circumferential surface of the cylinder 41 with the seal ring 61 located between. The rods 63 axially extend from outer circumferential portions of the piston body 62. The disc 64 is flange-shaped and coupled to a distal end of each rod 63. Piston communication bores 65 axially extend through circumferential portions of the piston body 62. The piston communication bores 65 include inner openings (openings located toward closed end 41*a* of cylinder 41) defining the suction valve ports 46. The piston communication bores 65 are arranged in locations (at angles) where the piston body 62 is free from the rods 63. The disc 64 is also provided with communication portions 66 that communicate in the axial direction.

The suction valve 47 of the present embodiment is an umbrella valve and formed by a discoid central support 47*a* and an elastically deformed portion 47*b* that extends radially outward from the central support 47*a*. The suction valve 47 is fixed to the piston body 62 on the central support 47a by the operation member 67 so that the elastically deformed portion 47b covers the suction valve ports 46. More specifically, a tubular large diameter portion 62a axially projects from the center of the piston body 62. A tubular small diameter portion 62b having a small diameter axially further projects from the center of the large diameter portion 62a. The central support 47a of the suction valve 47 is fitted onto the small diameter portion 62b and located between the large diameter portion 62a and the disc plate 68 in the axial direction. Additionally, the disc plate 68 is fixed by a head 67a of the operation member 67 that is thread-coupled or press-fitted in a central hole 62c extending through the small diameter portion 62b and the large diameter portion 62a. This holds the central support 47a (between the large diameter portion 62a and the disc plate 68). The operation member 67 opens the discharge valve 45 by pushing the operation projection 53 of the discharge valve 45 in accordance with the forward-backward movement of the piston 42 (refer to FIG. 13B).

As shown in FIG. 12, the piston 42 includes damper members 71 each of which is integrally formed by a forward movement damper 71a and a backward movement damper 71b. The forward movement dampers 71a contact a forward movement restriction 70 in a forward movement termination position. The backward movement dampers 71b contact a backward movement restriction 72 in a backward movement termination position. More specifically, a plurality of fixing holes 64a is circumferentially arranged and axially extends through the disc 64 of the piston 42. Each damper member 71 includes a shaft 71c received in a fixing hole 64a, the forward movement damper 71a located on one end of the shaft 71c, and the backward movement damper 71b located on the other end of the shaft 71c. The forward movement damper 71a and the backward movement damper 71b of the present embodiment are each semispherical and have a slightly larger diameter than the shaft 71c. When the forward movement damper 71a is, for example, squeezed into the fixing hole 64a, the shaft 71c is fixed in the fixing hole 64a. The forward movement restriction 70 inwardly extends from the inner surface of the cylinder 41 so as to contact the forward movement dampers 71a on the forward movement termination position of the piston 42. An end housing 73, which functions as a housing for the motor 43, is fixed to an opening of the cylinder 41 and closes the opening. The end housing 73 includes an end surface defining the backward movement restriction 72, which contacts the backward movement dampers 71b on the backward movement termination position of the piston 42.

The disc 64 of the piston 42 includes a central portion provided with a threaded hole 64b. The threaded hole 64b engages with a threaded shaft 74 that is rotated when driven by the motor 43. When the threaded shaft 74 is rotated, the piston 42 having the rotation restriction is driven forward and backward by the thread effect. More specifically, the motor 43 includes a tubular yoke housing 75 having an closed end and the end housing 73, which closes an opening (left end in FIG. 12) of the yoke housing 75. The motor 43 includes a magnet 76, which is fixed to an inner surface of the yoke housing 75, a rotation shaft 77, which is rotationally supported by an axial center of the yoke housing 75, and an armature core 78 and a commutator 79 (with wound coils), which are fixed to the rotation shaft 77. The threaded shaft 74 is coupled to and integrally rotational with the rotation shaft 77.

Communication bores 73a axially extend through the end housing 73 of the motor 43. The communication bore 73a communicates an inner side of the motor 43 and the space that receives the piston 42 in the cylinder 41. Additionally, an external communication bore 73b extends radially (in vertical direction in FIG. 12) through the end housing 73 and communicates the inner side of the motor 43 and an external space. Thus, the suction valve port 46, which the suction valve 47 is located on, is in communication with the exterior through the piston communication bores 65, the communication portions 66, the communication bore 73a, and the external communication bore 73b.

As shown in FIG. 1A, the air pump AP and the washer pump WP, which are configured as described above, are electrically connected to a controller 81 and driven by the controller 81.

The operation and effect of the controller 81 included in the on-vehicle optical sensor cleaning system (on-vehicle optical sensor cleaning device) having the above configuration will now be described.

When the washer pump WP and the air pump AP are not driven, the nozzle unit 6 is in a state in which the nozzle member 9 is moved rearward to the non-cleaning position by the urging force of the compression coil spring 27 (refer to FIG. 10). Thus, the nozzle member 9 is accommodated in the nozzle receptacle 7b of the on-vehicle optical sensor attachment bracket 7 and does not project from the on-vehicle optical sensor attachment bracket 7. The ejection ports 8 (distal portion of nozzle member 9) are located outside an image capturing range of the on-vehicle camera 5. Therefore, if an image is captured when the cleaning is not performed, the ejection ports 8 (distal portion of nozzle member 9) will not interfere with the image capturing. Additionally, the nozzle unit 6 including the nozzle member 9 is finely accommodated in the on-vehicle optical sensor attachment bracket 7.

If a signal for starting the cleaning is received, for example, when a switch SW (refer to FIG. 1A) located in the vehicle is operated or the shift lever SL of the gearshift device is operated to the reverse position, the controller 81 controls the driving of the washer pump WP (pump motor) and the air pump AP (motor 43) to eject the fluid from the ejection ports 8.

More specifically, the controller 81 controls the washer pump WP and the air pump AP as follows. The cleaning liquid is stored in the common intake chamber D, which is located inside the nozzle member 9, to cover the ejection ports 8. Then, air is fed to the nozzle member 9. This ejects a gas-liquid mixture of the cleaning liquid and the air. Additionally, after the gas-liquid mixture is ejected, the controller 81 controls the air pump AP to eject only air.

Figure 14:
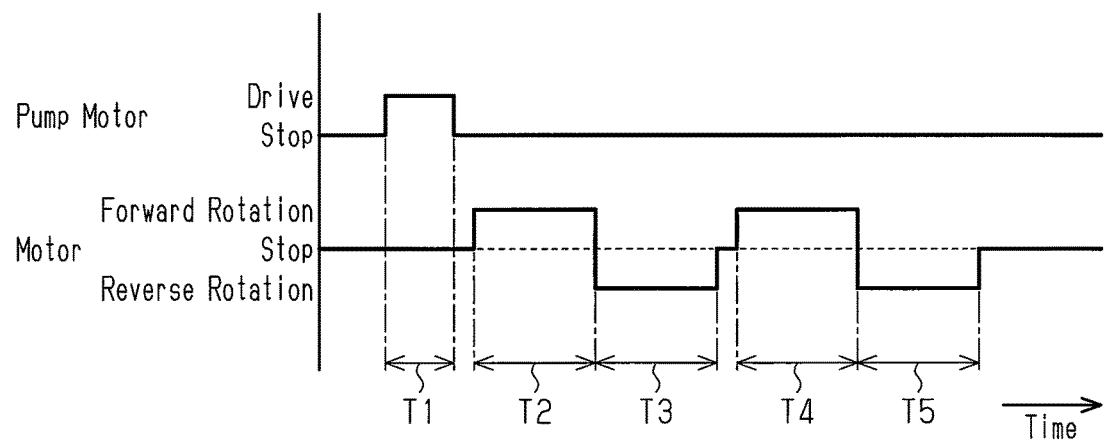
FIG. 14 is a time chart showing the operation of a washer pump and the air pump.

More specifically, as shown in FIG. 14, the controller 81 drives the washer pump WP (pump motor) for predetermined period T1. This feeds the cleaning liquid to the cleaning liquid intake passage 32c from the washer pump WP through the cleaning liquid hose H1. Then, the cleaning liquid is supplied into the nozzle member 9 from the cleaning liquid intake passage 32c through the cleaning-liquid-side check valve 33. At this time, the nozzle unit 6 is accommodated in the nozzle receptacle 7b and fixed by the on-vehicle optical sensor attachment bracket 7 so that the ejection ports 8 are located below the common intake chamber D in the gravitational direction. Thus, the cleaning liquid supplied into the nozzle member 9 is stored in the common intake chamber D and covers the ejection ports 8 (cleaning liquid may be subtly leaked from the ejection ports 8). In this case, the cleaning liquid also flows into the space SP located proximate to the basal flange 25*b* through a gap formed due to the loose fitting of the tube 24*a* and the inlet 31*d*.

After stopping the washer pump WP (pump motor), the controller 81 drives the air pump AP (motor 43). More specifically, the controller 81 drives the motor 43 in the forward rotation (refer to period T2 in FIG. 14). This forwardly rotates the rotation shaft 77 and the threaded shaft 74 and moves the piston 42 forward. The forward movement of the piston 42 reduces the space (pump chamber P) in the cylinder 41 and compresses the air in the space (pump chamber P).

As shown in FIG. 13B, when the operation member 67 of the piston 42 reaches and presses the operation projection 53, the discharge valve 45 opens. The compressed high-pressure air is instantaneously discharged from the air outlet passage 49*a* through the discharge valve port 44 and the discharge communication bore 51*a*. Consequently, the air is fed to the air intake passage 32*d* of the nozzle unit 6 from the air pump AP through the air hose H2 and then supplied into the nozzle member 9 from the air intake passage 32*d* through the air-side check valve 34. The air is mixed with the cleaning liquid stored in the common intake chamber D and ejected from the ejection ports 8 as the gas-liquid mixture. At this time, the mainstream of the fluid (air) is linearly directed to the distal end (ejection ports 8) of the nozzle member 9 by the inlet 31*d*. Additionally, a side stream of the fluid (air) also flows into the space SP located proximate to the basal flange 25*b* through the gap formed due to the loose fitting between the tube 24*a* and the inlet 31*d*. The feeding pressure moves the nozzle member 9 frontward (refer to FIG. 11). Consequently, as shown in FIG. 1B, the ejection ports 8 of the nozzle member 9 is moved to the cleaning position (refer to FIG. 11) from the non-cleaning position (refer to FIG. 10) to approach an image capturing range center X of the on-vehicle camera 5. The image capturing range of the present embodiment is a range of an image captured by the on-vehicle camera 5 (image capturing element) through the lens 5*b*, that is, a range shown on a display DSP. FIG. 1B shows the view shown on the display DSP and an ejection port 8 (distal portion of nozzle member 9) located in the image capturing range. Also, FIG. 1B schematically shows an ejection port 8 (distal portion of nozzle member 9) located at the non-cleaning position outside the image capturing range indicated by double-dashed lines. At this time, the stored cleaning liquid covers the ejection ports 8. This further increases the pressure of the drawn air in an instantaneous manner. The cleaning liquid is mixed with the air as pushed by the high pressure and ejected from the ejection ports 8. Thus, the lens 5*b* is cleaned by the gas-liquid mixture ejected under higher pressure in a satisfactory manner.

Then, the controller 81 drives the motor 43 in the reverse rotation (refer to T3 in FIG. 14). This reversely rotates the threaded shaft 74 with the rotation shaft 77 and moves the piston 42 backward. The backward movement enlarges the space (pump chamber P) between the piston 42 and the cylinder 41 and results in the space (pump chamber P) having negative pressure. This opens the suction valve 47 and draws air into the cylinder 41 (pump chamber P) from the suction valve ports 46. More specifically, the air is drawn into the cylinder 41 (pump chamber P) from the outside of the air pump AP through the external communication bore 73*b* and the communication bore 73*a* of the motor 43, the communication portions 66, and the piston communication bores 65 (suction valve ports 46). At this time, the operation member 67 of the piston 42 is separated from the operation projection 53 of the discharge valve 45. Thus, the discharge valve 45 performs the closing operation to close the discharge valve port 44.

Then, the controller 81 drives the motor 43 of the air pump AP in the forward rotation (refer to period T4 in FIG. 14) as described above without driving the washer pump WP (pump motor) so that only air is ejected. This feeds air from the air pump AP to the air intake passage 32*d* through the air hose H2 and then supplied into the nozzle member 9 from the air intake passage 32*d* through the air-side check valve 34. Consequently, when the nozzle member 9 moves frontward (to the cleaning position), the ejection ports 8 eject only the air. As a result, the cleaning liquid, which was applied to the lens 5*b* when the gas-liquid mixture was ejected, is blown away by the ejection of only air.

The controller 81 drives the motor 43 of the air pump AP in the reverse rotation as described above (refer to period T5 in FIG. 14) and terminates the control with air drawn in the cylinder 41 (pump chamber P).

The first embodiment has the advantages described below.

(1) The controller 81 controls the washer pump WP and the air pump AP. The cleaning liquid is stored in the nozzle member 9 (common intake chamber D) to cover the ejection ports 8. Then, air is fed to the nozzle member 9. This ejects the gas-liquid mixture of the cleaning liquid and the air. In this configuration, when the air is fed into the nozzle member 9, the cleaning liquid is stored and covers the ejection ports 8. Thus, the air pressure is further increased in an instantaneous manner. The cleaning liquid is mixed with the air as pushed by the high pressure and ejected from the ejection ports 8. Thus, the gas-liquid mixture is ejected under higher pressure. This effectively cleans the lens 5*b*.

(2) The controller 81 controls the air pump AP to eject only air after ejecting the gas-liquid mixture. The ejection of only air blows away the cleaning liquid, which was applied to the lens 5*b* when the gas-liquid mixture was ejected. This allows the display DSP to show a captured image having limited deformation caused by the cleaning liquid.

(3) The nozzle member 9 is capable of moving frontward and rearward while accommodated in the cylinder housing 21. Additionally, the nozzle member 9 includes a distal portion provided with the ejection ports 8 and is urged and moved frontward by air feeding pressure. Thus, the distal portion will not project when air is not fed. This improves the ornamental feature when the cleaning is not performed. Additionally, when the cleaning is not performed, the nozzle member 9 is located at the non-cleaning position outside the image capturing range of the on-vehicle camera 5 and does not interfere with the image capturing. When the cleaning is performed, the nozzle member 9 moves to the cleaning position located close to the image capturing range center X of the on-vehicle camera 5 and ejects the fluid from a position close to the front surface of the lens 5*b*. This effectively cleans the lens 5*b*.

(4) After stopping the washer pump WP (pump motor), the controller 81 drives the air pump AP (motor 43) to eject the gas-liquid mixture. Thus, the air is assuredly fed after the cleaning liquid is stored. This ensures the ejection of the gas-liquid mixture under higher pressure.

(5) The feeding pressure of the fluid (air) moves the nozzle member 9 frontward. The fluid is ejected from the ejection ports 8, which are located in the distal portion of the nozzle member 9, toward the lens 5*b*. The gas-liquid mixture of the cleaning liquid and the air may be ejected, for example, by feeding the cleaning liquid and then air to the common intake chamber D. This removes an object from the lens 5*b*. Further, only air may be ejected by feeding only air to the common intake chamber D. This blows away the cleaning liquid from the lens 5*b*. Additionally, when the cleaning liquid is fed to the common intake chamber D, the air-side check valve 34 prevents a reverse flow of the cleaning liquid toward the air intake passage 32*d*. Also, when the air is fed to the common intake chamber D, the cleaning-liquid-side check valve 33 prevents a reverse flow of the air toward the cleaning liquid intake passage 32*c*. This selectively ejects the gas-liquid mixture and the air in an appropriate manner.

(6) The inlet member 31 includes the tubular inlet 31*d* that communicates the downstream side of the cleaning-liquid-side check valve 33 and the downstream side of the air-side check valve 34 and is loosely fitted to the inner circumferential surface of the nozzle member 9 from the basal end of the nozzle member 9. This linearly directs the mainstream of the fluid to the distal end (ejection ports 8) of the nozzle member 9. Additionally, the side stream of the fluid also flows to the side of the basal flange 25*b* (space SP) through the gap formed due to the loosely fitting. The feeding pressure moves the nozzle member 9 frontward. In this configuration, some of the cleaning liquid may remain in the space SP between the basal flange 25*b* and the basal end of the cylinder housing 21. Even in this case, when ejecting only air, air may be almost exclusively ejected without including the remained cleaning liquid because the mainstream passage in the inlet 31*d* and the space SP are separated by the inlet 31*d*. This prevents a mixture of the cleaning liquid when only air is to be ejected. Thus, the lens 5*b* may be free from the cleaning liquid, for example, by blowing away the cleaning liquid from the lens 5*b* with the air that is ejected almost exclusively.

(7) The piston unit 28 is formed by a subassembly in which the piston nozzle member 24, the flange member 25, the spring holder 23, and the compression coil spring 27 are coupled. The piston unit 28 is coupled by inserting into the cylinder housing 21 from the basal end of the cylinder housing 21. This improves the coupling efficiency, for example, as compared to a coupling configuration in which the piston nozzle member 24 is inserted into the cylinder housing 21 from the distal end of the cylinder housing 21 and other members including the flange member 25 are each inserted into the cylinder housing 21 from the basal end of the cylinder housing 21.

(8) The separation restriction grooves 25*d* axially extend in the packing fitting recess 25*c* that outwardly opens in the radial direction of the basal flange 25*b*. The fitting portion 26*a* of the lip packing 26, which is fitted to the packing fitting recess 25*c*, includes the separation restriction projections 26*e*. The separation restriction projections 26*e* are fitted to the separation restriction grooves 25*d*. This limits situations in which the lip packing 26 is removed from the basal flange 25*b*.

(9) The sensor receptacle 7*a*, which accommodates the on-vehicle camera 5, and the nozzle receptacle 7*b*, which accommodates the nozzle unit 6, are integrally formed with each other. Thus, the on-vehicle camera 5 and the nozzle unit 6 may be coupled to the vehicle 1 while obtaining the favorable ornamental feature.

(10) The on-vehicle optical sensor attachment bracket 7 includes the liquid release portions 7*j*, 7*k* capable of receiving the cleaning liquid at locations corresponding to the ejection ports 8 of the nozzle member 9 when located at the non-cleaning position. This limits a leakage of the cleaning liquid to the exterior even when, for example, the cleaning liquid is subtly leaked from the ejection ports 8 of the nozzle member 9 located at the non-cleaning position. Thus, situations are limited in which the cleaning liquid is leaked form the ejection ports 8 and applied to the lens 5*b* of the on-vehicle camera 5. The liquid release portions 7*j*, 7*k* of the present embodiment are formed in the sensor receptacle 7*a* and the nozzle receptacle 7*b* by communicating the sensor receptacle 7*a* and the nozzle receptacle 7*b*, that is, a partition wall is not formed, at locations corresponding to the ejection ports 8. This facilitates the receiving of the cleaning liquid, that is, hinders the leakage of the cleaning liquid toward the lens 5*b*, as compared to a structure in which a liquid release portion is located on one side.

(11) The liquid release portion 7*j* is provided with the discharge bores 7*m*, 7*n* that open in directions different from the exposure bore 7*f* (lens 5*b*). In the present embodiment, the discharge bores 7*m*, 7*n* are opened in the gravitational direction (downward). The cleaning liquid leaked to (received in) the liquid release portion 7*j* from the ejection ports 8 is discharged from the discharge bores 7*m*, 7*n*. This prevents, for example, a leakage of the cleaning liquid toward the lens 5*b*.

(12) The nozzle receptacle 7*b* includes the rotation restricting portion 16 that engages with the rotation restricted portion 15 arranged on the outer circumferential surface of the cylinder housing 21 of the nozzle unit 6. Thus, the cylinder housing 21 is easily positioned. This accurately directs the ejection ports 8 of the nozzle member 9, that is, the fluid ejection, toward the lens 5*b*.

(13) The on-vehicle optical sensor unit 3 is fixed to a position located slightly toward the driver seat side (right side) from the lateral center line C of the vehicle 1. Thus, the sensor receptacle 7*a* and the on-vehicle camera 5 are located toward one side (driver seat side) from the lateral center line C of the vehicle 1. Additionally, the nozzle receptacle 7*b* and the nozzle member 9 are located further toward the side relative to the on-vehicle camera 5. Thus, the cleaning liquid, which is the fluid ejected from the ejection ports 8 toward the lens 5*b*, is ejected toward the lateral center line C of the vehicle 1. This limits situations in which the cleaning liquid is dispersed to a laterally outer side of the vehicle 1.

(14) The suction valve ports 46 are openings of the piston communication bores 65 formed in the piston 42. The suction valve ports 46 are in communication with the exterior through the piston communication bores 65 and the external communication bore 73*b* located in the end housing 73 of the motor 43. This increases the distance between the external communication bore 73*b* and the suction valve ports 46 and reduces an external leakage of noise such as a whistle sound generated in the suction valve ports 46 and a flapping sound of the suction valve 47 when the piston 42 moves backward.

(15) The operation member 67 is fastened to the piston 42 and performs the opening operation by pushing the discharge valve 45 when the piston 42 moves forward. The suction valve 47 is fastened to the piston 42 by the operation member 67. Thus, the operation member 67 for pushing the discharge valve 45 also functions to fasten the suction valve 47.

(16) The piston 42 includes the damper members 71. Each damper member 71 is integrally formed by a forward movement damper 71*a*, which contacts the forward movement restriction 70 in the forward movement termination position, and a backward movement damper 71*b*, which contacts the backward movement restriction 72 in the backward movement termination position. Thus, shocks on the forward movement termination position and the backward movement termination position may be absorbed while reducing the number of components as compared to a structure in which a forward movement damper and a backward movement damper are separate bodies.

The first embodiment may be modified as follows.

Figure 15:
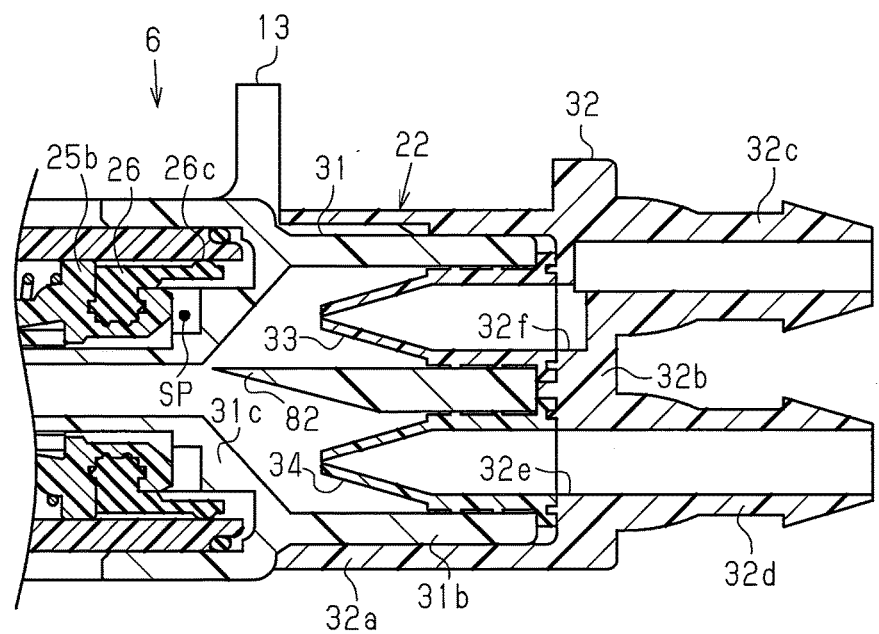
FIG. 15 is a cross-sectional view showing a portion of a modified example of the nozzle unit of the first embodiment.

As shown in FIG. 15, an orifice piece 82 may be located on a downstream position between the cleaning-liquid-side check valve 33 and the air-side check valve 34 of the first embodiment. The orifice piece 82 decreases the cross-sectional area of the cleaning-liquid-side flow passage to be smaller than the cross-sectional area of the air-side flow passage. In this structure, for example, the flow rate of the cleaning liquid fed to the common intake chamber D is easily controlled. Additionally, the cross-sectional area of the air flow passage is ensured without any decrease. This maintains the feeding pressure of air. The cleaning liquid may remain in space located at an immediately downward position of the cleaning-liquid-side check valve 33. Even in such a case, when ejecting only air, air may be almost exclusively ejected without including the remained cleaning liquid because the orifice piece 82 separates the air flow passage and the space. This limits a mixture of the cleaning liquid when only air is to be ejected. Thus, the lens 5b may be free from the cleaning liquid, for example, by blowing away the cleaning liquid from the lens 5b with the air that is ejected almost exclusively.

Figure 16:
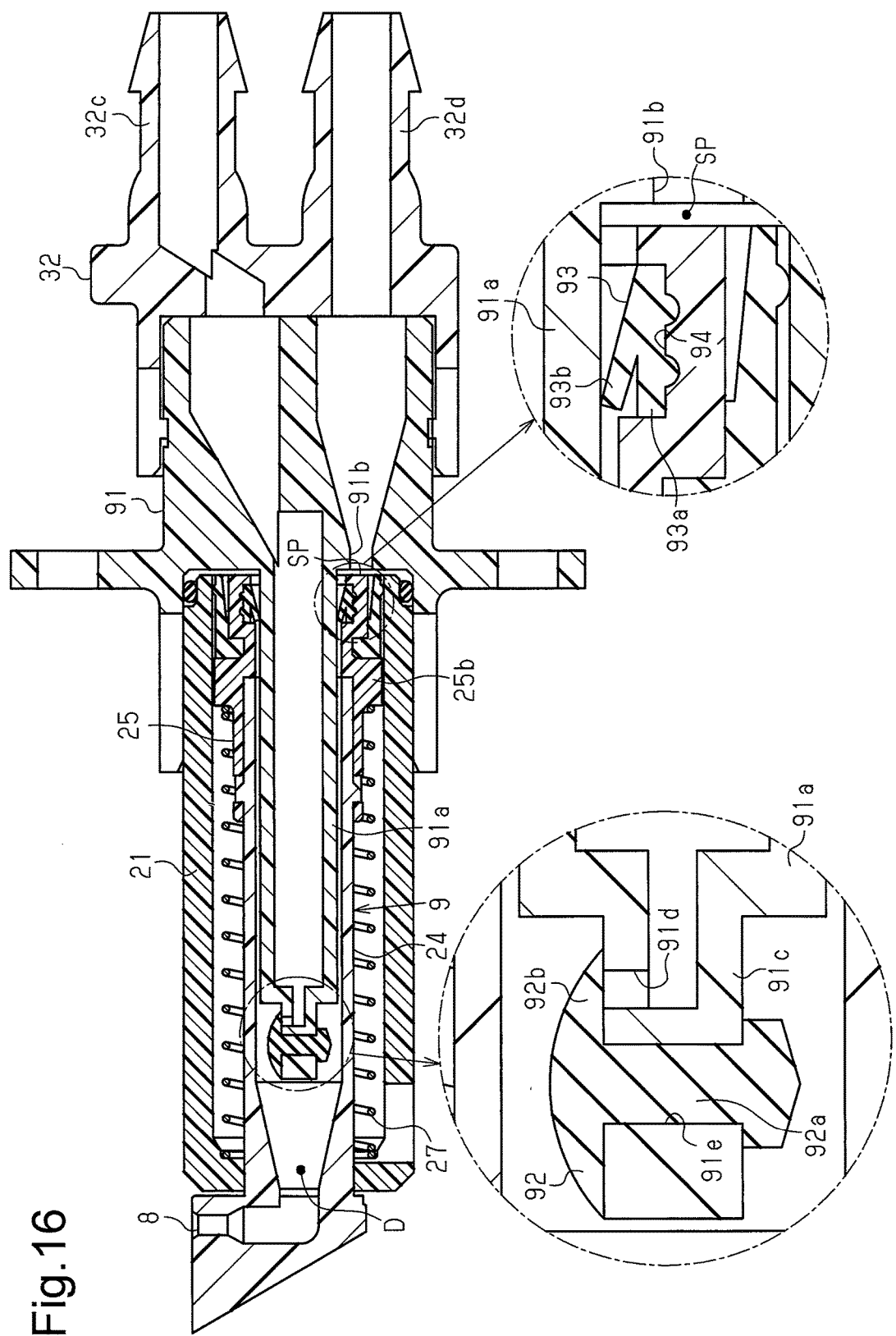
FIG. 16 is a cross-sectional view showing a portion of a modified example of the nozzle unit of the first embodiment.

The first embodiment may be modified as shown in FIG. 16. In this example, the inlet member 31 (refer to FIG. 10) of the first embodiment is changed to an inlet communication member 91 that includes a cleaning liquid inlet 91a and an air communication passage 91b. The cleaning liquid inlet 91a is in communication with the downstream side of the cleaning liquid intake passage 32c. The cleaning liquid inlet 91a is tubular and loosely fitted to the inner circumferential surface of the nozzle member 9 from the basal end of the nozzle member 9. The air communication passage 91b communicates the space SP located between the basal flange 25b and the basal end of the cylinder housing 21 to the downstream side of the air intake passage 32d. In this example (FIG. 16), same reference characters are given to components that are the same as the corresponding components of the first embodiment (refer to FIG. 10).

The cleaning-liquid-side check valve 92 is located on the distal portion of the cleaning liquid inlet 91a. More specifically, a distal tube 91c having a closed end with a decreased diameter extends from the distal portion of the cleaning liquid inlet 91a. A through hole 91d extends radially outward through the distal tube 91c from an inner side of the distal tube 91c. The closed end of the distal tube 91c is provided with a valve fixing hole 91e that extends parallel to the through hole 91d. The cleaning-liquid-side check valve 92 is fixed to the valve fixing hole 91e. The cleaning-liquid-side check valve 92, which is an umbrella valve, includes a support shaft 92a and an elastically deformed portion 92b that extends radially outward from one end of the support shaft 92a. The support shaft 92a is inserted and fixed in the valve fixing hole 91e so that the elastically deformed portion 92b covers the through hole 91d. Thus, the cleaning-liquid-side check valve 92 allows the cleaning liquid to flow from the cleaning liquid inlet 91a to the common intake chamber D, which is located at the distal end of the cleaning liquid inlet 91a, and blocks a fluid flowing into the cleaning liquid inlet 91a from the common intake chamber D. The cleaning-liquid-side check valve 92 is located on the small diameter part of the distal portion of the cleaning liquid inlet 91a. Thus, a step formed by the large diameter part and the small diameter part avoids a situation in which the cleaning-liquid-side check valve 92 interferes with the backward and forward movement of the nozzle member 9.

The air-side check valve 93 is located between a radially inner side of the nozzle member 9 and the cleaning liquid inlet 91a. More specifically, the basal portion of the nozzle member 9 includes a valve receptacle 94 that opens radially inward. The valve receptacle 94 holds the air-side check valve 93. The air-side check valve 93 is formed by a rubber material and includes a support tube 93a, which is fitted into and fixed to the valve receptacle 94, and a valve portion 93b, which projects radially inward from a basal portion of the support tube 93a and obliquely extends toward the distal side. The valve portion 93b is in press contact with the outer circumferential surface of the cleaning liquid inlet 91a. The valve portion 93b allows air to flow to the common intake chamber D from the space SP located at the basal end of the cylinder housing 21 and blocks a fluid flowing to the space SP from the common intake chamber D. In this structure, the cleaning-liquid-side check valve 92 and the air-side check valve 93 are arranged next to each other in the longitudinal direction of the cylinder housing 21 (frontward-rearward movement direction of nozzle member 9, longitudinal direction of nozzle member 9).

In this structure, the cleaning liquid is fed to the common intake chamber D, which is a small space located at the distal end of the cleaning liquid inlet 91a. The air-side check valve 93 is located at the radially inner side of the nozzle member 9 (between nozzle member 9 and cleaning liquid inlet 91a). This prevents the cleaning liquid from entering the space SP located at the basal end of the cylinder housing 21. Additionally, the air communication passage 91b communicates the space SP and the downstream side of the air intake passage 32d. Thus, the nozzle member 9 is moved frontward by the feeding pressure of the air, and also the air is fed to the common intake chamber D from the space SP through the air-side check valve 93 and the gap formed due to the loosely fitting. In this structure, the common intake chamber D is a small space located at the distal end of the cleaning liquid inlet 91a, and air is fed through the gap formed due to the loosely fitting and located outside the cleaning liquid inlet 91a. Thus, even when the cleaning liquid is fed to the common intake chamber D and then air is fed to eject the gas-liquid mixture, the cleaning liquid is almost completely removed from air flow passages including the common intake chamber D. This limits a mixture of the cleaning liquid when only air is to be ejected. Thus, the lens 5b may be free from the cleaning liquid, for example, by blowing away the cleaning liquid from the lens 5b with the air that is ejected almost exclusively. Additionally, the cleaning-liquid-side check valve 92 and the air-side check valve 93 are arranged next to each other in the longitudinal direction of the cylinder housing 21. This may reduce the size in a direction orthogonal to the longitudinal direction, for example, compared to a structure having a longitudinal arrangement. In the same manner as the first embodiment, in this example (refer to FIG. 16), the cleaning liquid intake passage 32c and the air intake passage 32d are arranged next to each other in the direction orthogonal to the longitudinal direction. However, a cleaning liquid intake passage and an air intake passage may be arranged, for example, in the longitudinal direction. This may reduce the size in the direction orthogonal to the longitudinal direction.

In the first embodiment, the inlet member 31 includes the tubular inlet 31d that communicates the downstream side of the cleaning-liquid-side check valve 33 and the downstream side of the air-side check valve 34 and is loosely fitted to the inner circumferential surface of the nozzle member 9 from the basal end of the nozzle member 9. However, the inlet 31*d* (inlet member 31) may be omitted from the structure.

In the first embodiment, the piston unit 28 is formed by a subassembly in which the piston nozzle member 24, the flange member 25, the spring holder 23, and the compression coil spring 27 are coupled. The piston unit 28 is configured to be coupled to the cylinder housing 21 by being inserted into the cylinder housing 21 from the basal end of the cylinder housing 21. However, the piston unit 28 may be configured not to be coupled in such a manner. For example, as shown in FIG. 16, the spring holder 23 of the first embodiment may be omitted. In this case, the coupling structure may be such that the piston nozzle member 24 is inserted into the cylinder housing 21 from the distal end of the cylinder housing 21 whereas the compression coil spring 27 and the flange member 25 are inserted into the cylinder housing 21 from the basal end of the cylinder housing 21.

In the first embodiment, the separation restriction grooves 25*d* axially extend in the packing fitting recess 25*c*, and the separation restriction projections 26*e*, which are fitted to the separation restriction grooves 25*d*, project from the fitting portion 26*a* of the lip packing 26. However, the separation restriction grooves 25*d* and the separation restriction projections 26*e* may be omitted.

In the first embodiment, the on-vehicle optical sensor attachment bracket 7 includes the liquid release portions 7*j*, 7*k*, which are capable of receiving the cleaning liquid, at locations corresponding to the ejection ports 8 of the nozzle member 9 when located at the non-cleaning position. However, the liquid release portions 7*j*, 7*k* may be omitted from the structure. Additionally, in the first embodiment, the liquid release portions 7*j*, 7*k* are formed in the sensor receptacle 7*a* and the nozzle receptacle 7*b*. However, only one of the liquid release portions 7*j*, 7*k* may be formed.

In the first embodiment, the liquid release portions 7*j*, 7*k* are provided with the discharge bores 7*m*, 7*n* that open in directions different from the exposure bore 7*f* (lens 5*b*). In the first embodiment, the discharge bores 7*m*, 7*n* are open in the gravitational direction (downward). However, the discharge bores 7*m*, 7*n* may be omitted from the structure. Alternatively, the structure may include only one of the discharge bore 7*m* of the sensor receptacle 7*a* and the discharge bores 7*n* of the nozzle receptacle 7*b*. This structure also limits an external leakage of the cleaning liquid when the amount of the cleaning liquid is small. This limits application of the cleaning liquid to the lens 5*b* of the on-vehicle camera 5.

In the first embodiment, the nozzle receptacle 7*b* includes the rotation restricting portion 16 that engages with the rotation restricted portion 15 arranged on the outer circumferential surface of the cylinder housing 21 of the nozzle unit 6. Instead, another configuration or process may be used to position the cylinder housing 21.

In the first embodiment, the sensor receptacle 7*a* and the on-vehicle camera 5 are located toward one side (driver seat side) from the lateral center line C of the vehicle 1. Additionally, the nozzle receptacle 7*b* and the nozzle member 9 are located further toward the side relative to the on-vehicle camera 5. However, the components may be located at other positions. For example, when the sensor receptacle 7*a* and the on-vehicle camera 5 are located toward one side from the lateral center line C of the vehicle 1, the nozzle receptacle 7*b* and the nozzle member 9 may be located toward the other side relative to the on-vehicle camera 5. Alternatively, the sensor receptacle 7*a* and the on-vehicle camera 5 may be located on the lateral center line C of the vehicle 1.

In the first embodiment, the suction valve ports 46 are in communication with the exterior through the external communication bore 73*b* located in the end housing 73. Instead, an external communication bore may be located in another housing of the motor 43. The yoke housing 75 may be provided with an external communication bore through which the suction valve ports 46 are in communication with the exterior.

In the first embodiment, the operation member 67 for pushing the discharge valve 45 also functions to fasten the suction valve 47. Instead, the functions may have independent structures.

In the first embodiment, the air pump AP is used as a portion of the on-vehicle optical sensor cleaning system. However, the air pump may be used for another system.

In the first embodiment, the controller 81 controls the air pump AP to eject only air after ejecting the gas-liquid mixture. Instead, the control may be terminated when the gas-liquid mixture is ejected without the ejection of only air. Additionally, for example, when a liquid such as raindrops is applied to the lens 5*b*, only air may be ejected without the ejection of the gas-liquid mixture.

In the first embodiment, the nozzle member 9 is capable of moving frontward and rearward while accommodated in the cylinder housing 21. Additionally, the nozzle member 9 includes a distal portion provided with the ejection ports 8 and is urged and moved frontward by feeding pressure of a fluid (air). Instead, the nozzle member 9 may be changed to an immovable nozzle member that is arranged in the vehicle 1 and does not move frontward and rearward.

In the first embodiment, the controller 81 starts to drive the air pump AP (motor 43) so that the gas-liquid mixture is ejected after stopping the washer pump WP (pump motor). However, the configuration may be changed to another control as long as the cleaning liquid is stored in the nozzle member 9 (common intake chamber D) to cover the ejection ports 8, and then air is fed to the nozzle member 9.

For example, before the washer pump WP (pump motor) is stopped, the driving of the air pump AP (motor 43) may be started. More specifically, the control may be performed so that, for example, the driving of the washer pump WP (pump motor) and the air pump AP (motor 43) are simultaneously started. Then, after the washer pump WP (pump motor) is stopped, the operation member 67 of the air pump AP may push the operation projection 53 of the discharge valve 45 to open the discharge valve 45. This shortens the time until the gas-liquid mixture is ejected.

In the first embodiment, when the piston 42 moves forward, the operation member 67 pushes the operation projection 53 of the discharge valve 45 to open the discharge valve 45. Instead, the discharge valve 45 may open using air compressed by the forward movement of the piston 42. Thus, the operation projection 53 may be omitted.

In the first embodiment, the on-vehicle optical sensor unit 3 is arranged on the rear door 2. However, the on-vehicle optical sensor unit 3 may be arranged on any position of a rear portion of the vehicle 1. Further, the on-vehicle optical sensor unit 3 may be arranged on a front portion or a side portion (near door mirror) of the vehicle 1.

A second embodiment of the vehicle will now be described with reference to FIGS. 17A to 25.

As shown in FIG. 17A, the rear door 2 is located on the rear of the vehicle 1, and an on-vehicle optical sensor unit 103 is arranged on the rear door 2. The on-vehicle optical sensor unit 103 of the second embodiment is fixed to a position located slightly toward the driver seat side (right side) from the lateral center line C of the vehicle 1.

Figure 18:
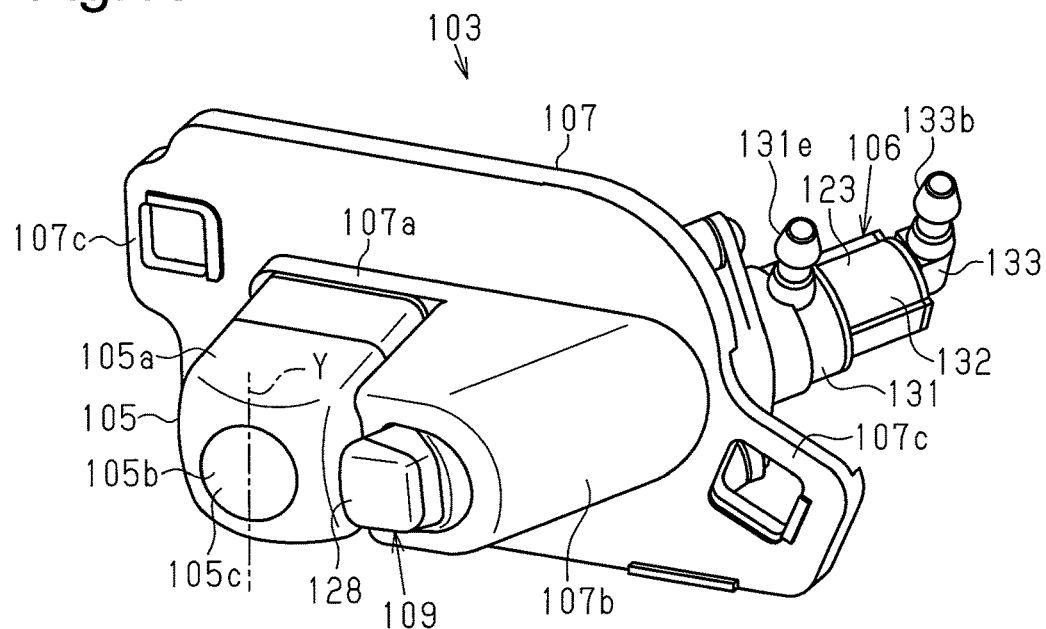
FIG. 18 is a perspective view of the on-vehicle optical sensor unit shown in FIG. 17A.
Figure 19:
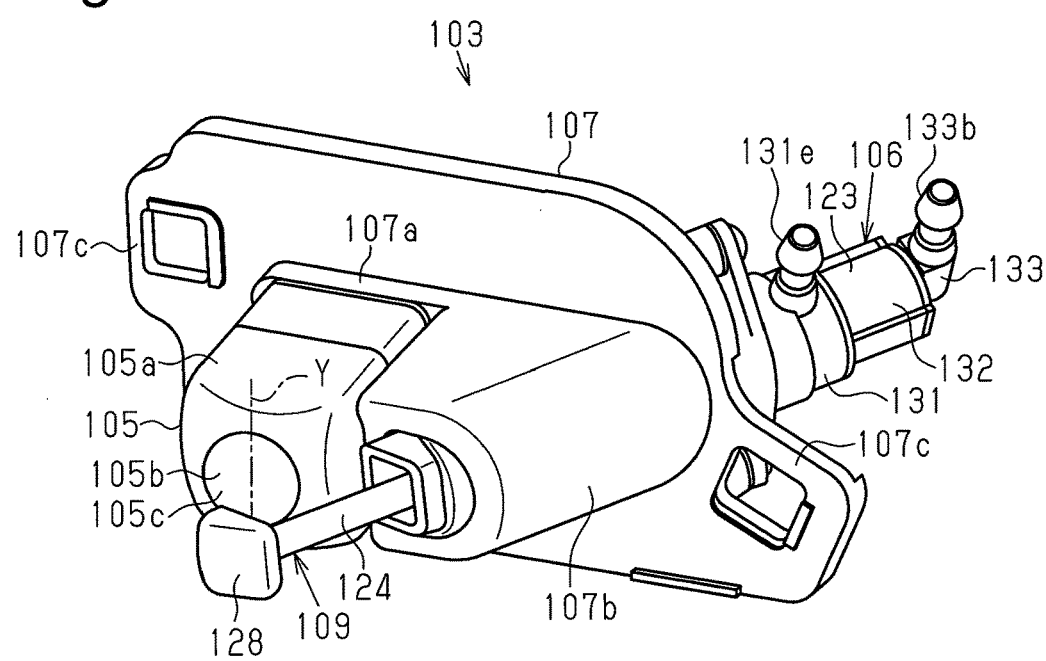
FIG. 19 is a perspective view of the on-vehicle optical sensor unit shown in FIG. 17A.
Figure 20:
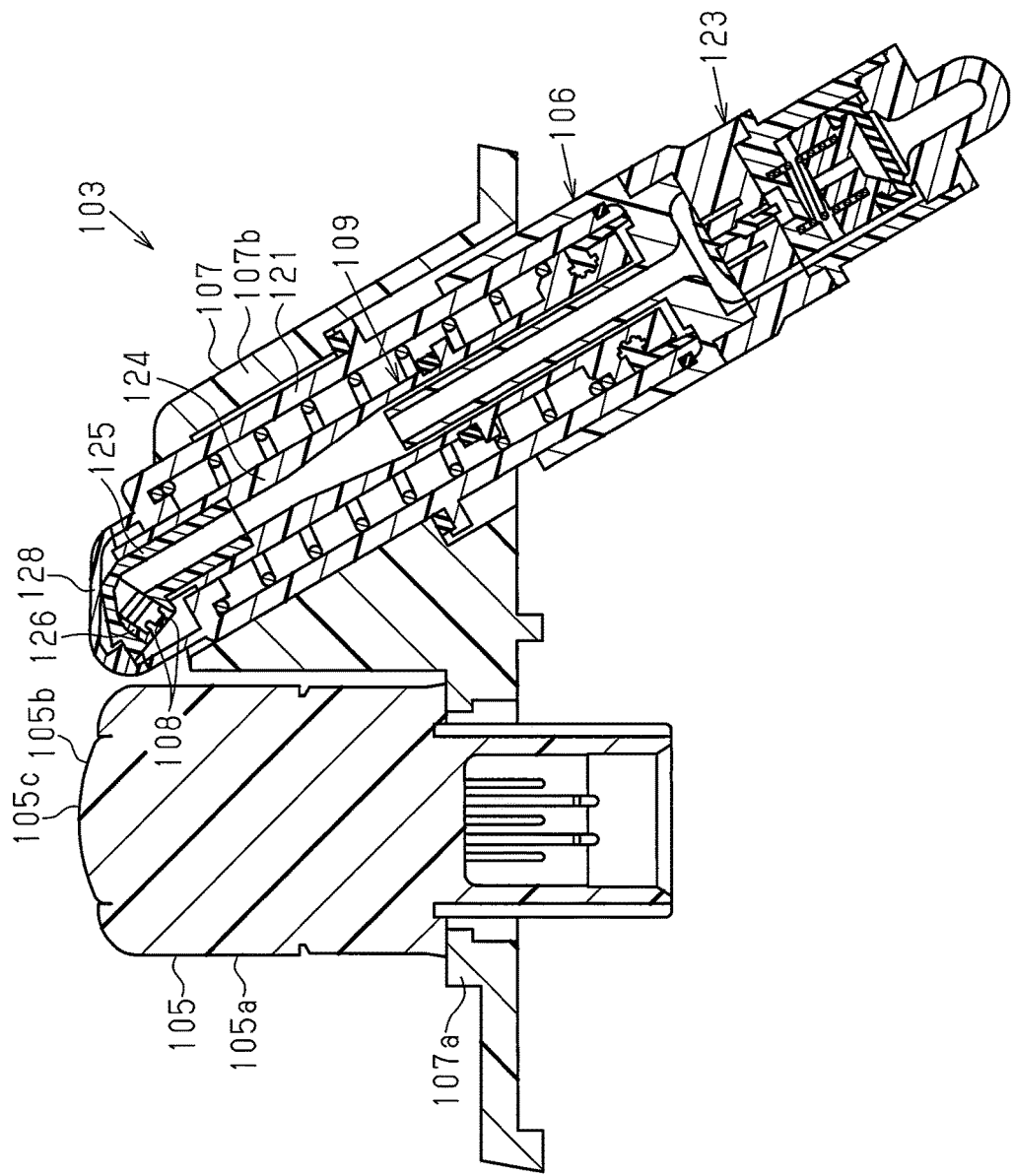
FIG. 20 is a cross-sectional view of the on-vehicle optical sensor unit shown in FIG. 18.

As shown in FIGS. 18 to 20, the on-vehicle optical sensor unit 103 includes an on-vehicle camera 105, which functions as an on-vehicle optical sensor, a nozzle unit 106, which functions as an on-vehicle optical sensor cleaning device, and an on-vehicle optical sensor attachment bracket 107.

The on-vehicle camera 105 includes a cuboid body 105a, which accommodates an image capturing element (not shown), and a lens 105b, which is located on one surface of the body 105a and functions as a sensing surface (external image capturing surface). The lens 105b includes a central major portion defining an effective surface 105c that is a range of the surface of the lens 105b corresponding to the image capturing range W (refer to FIG. 25) of the image capturing element.

As shown in FIGS. 17A, 17B, for example, when the shift lever SL of the gearshift device is operated to the reverse position, the on-vehicle camera 105 transmits a captured image of a rear side of the vehicle 1 to the in-vehicle display DSP to show the image. The on-vehicle camera 105 is fixed to the rear door 2 by the on-vehicle optical sensor attachment bracket 107 so that the lens 105b (effective surface 105c) faces obliquely downward to capture an oblique downward image of the rear side of the vehicle 1.

As shown in FIGS. 18 and 19, the on-vehicle optical sensor attachment bracket 107 is integrally formed by a sensor fastening portion 107a, which fastens the on-vehicle camera 105, a nozzle receptacle 107b, which accommodates the nozzle unit 106, and a vehicle fastening portion 107c.

Figure 21:
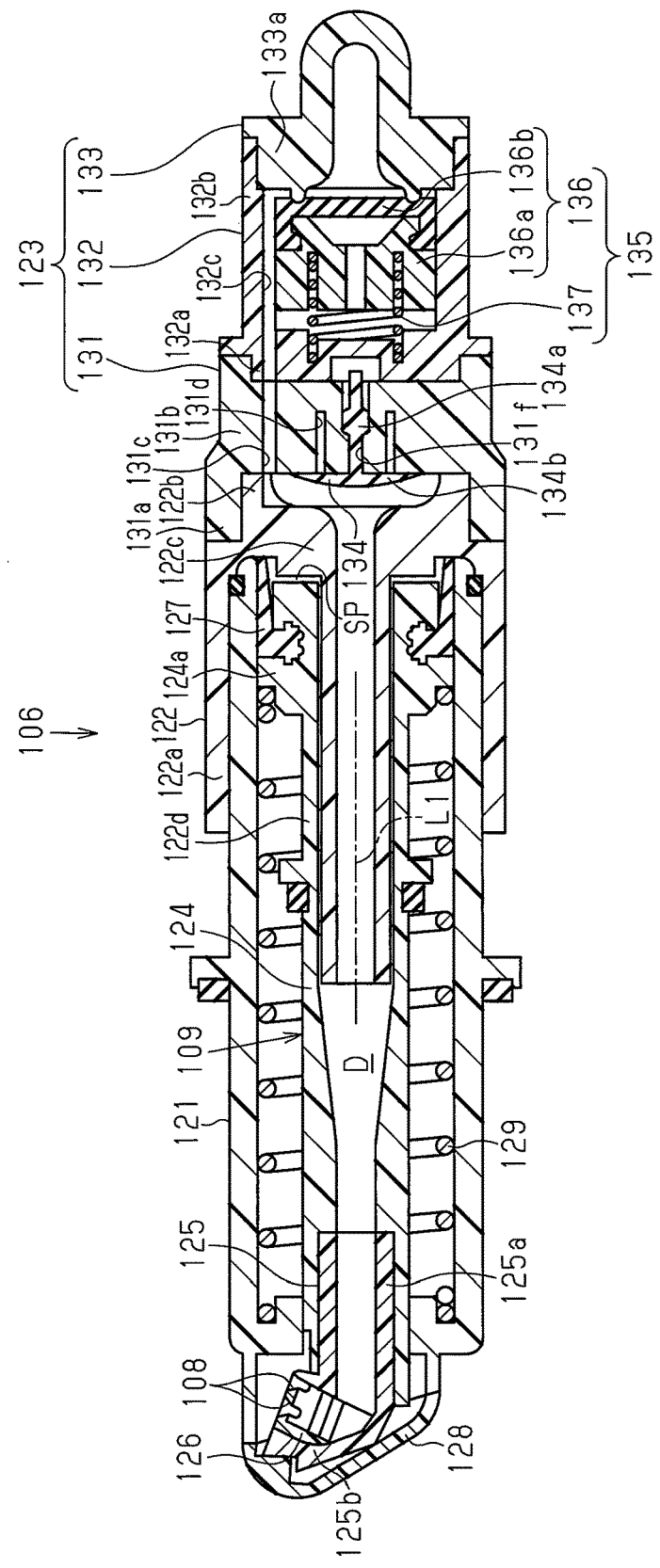
FIG. 21 is a cross-sectional view of a nozzle unit.
Figure 25:
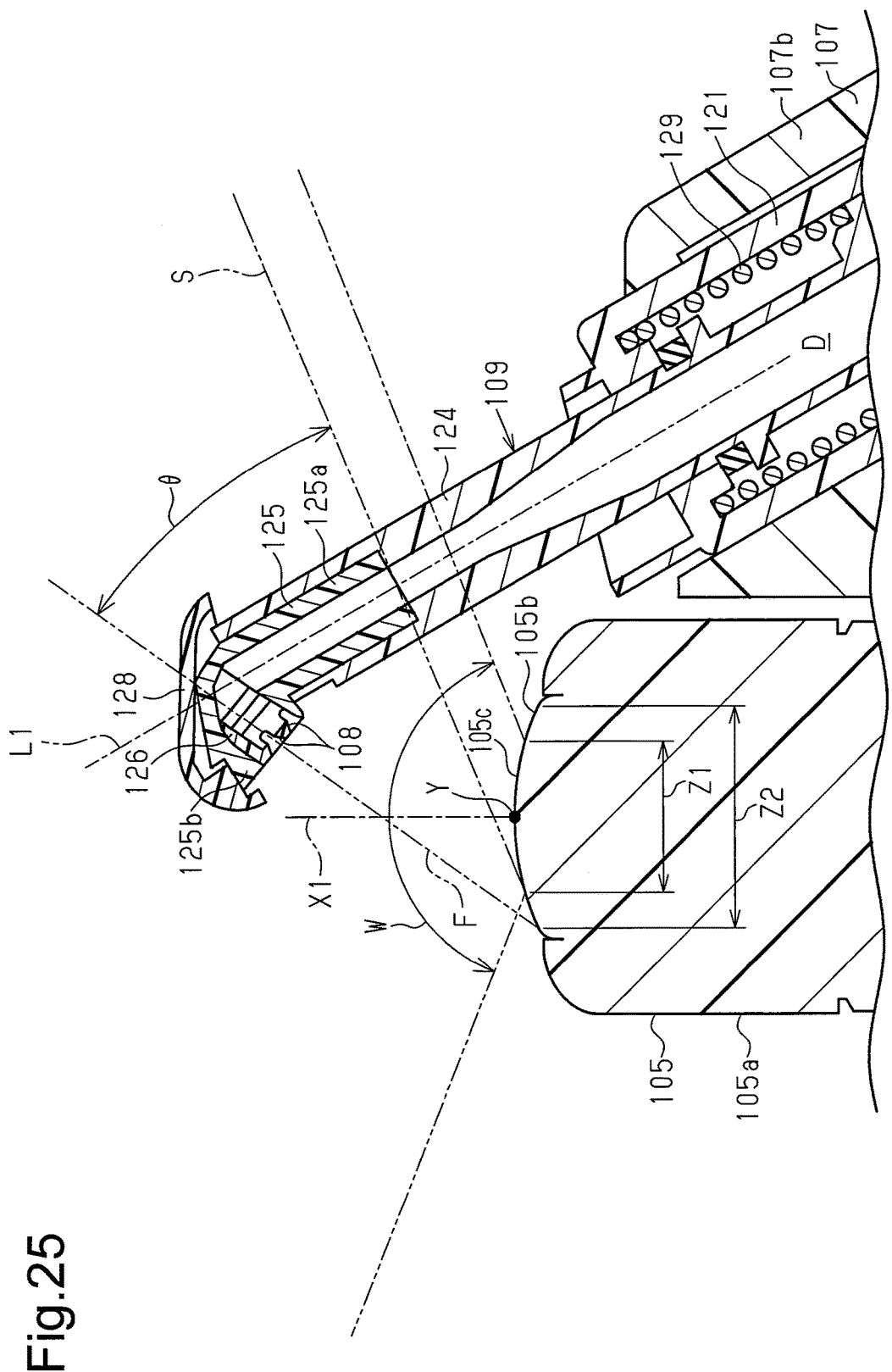
FIG. 25 is an enlarged cross-sectional view showing a portion of the on-vehicle optical sensor unit.

As shown in FIGS. 20, 21, and 25, the entire contour of the nozzle unit 106 is cylindrical. The nozzle unit 106 includes a movable nozzle member 109 including ejection ports 108. When moved (movable) from the non-cleaning position (refer to FIGS. 18, 20 and 21) to the cleaning position (refer to FIGS. 19 and 25), the nozzle member 109 projects outward and ejects a fluid from the ejection ports 108 toward the lens 105b. In the present embodiment, the fluid is one of a cleaning liquid, air, and a gas-liquid mixture.

More specifically, as shown in FIG. 21, the nozzle unit 106 includes an elongated tubular cylinder housing 121, the nozzle member 109, an inlet member 122, and an intake member 123.

As shown in FIG. 20, the cylinder housing 121 has the form of an elongated tube and includes an outer circumference. The cylinder housing 121 is held when the outer circumference is accommodated in the nozzle receptacle 107b of the on-vehicle optical sensor attachment bracket 107.

As shown in FIG. 21, the nozzle member 109 includes an elongated tubular piston member 124, a distal nozzle member 125 fixed to a distal portion of the piston member 124, and a nozzle tip 126 fixed to the distal nozzle member 125.

A basal flange 124a projects radially outward from a basal portion of the piston member 124. A lip packing 127 is fitted to the piston member 124 at a location further in the basal direction from the basal flange 124a. When the piston member 124 is capable of moving frontward and rearward in the cylinder housing 121, the lip packing 127 slides while press-contacting an inner circumferential surface of the cylinder housing 121. The distal nozzle member 125 includes an inner fitting tube 125a, which is fitted into the distal portion of the piston member 124, and a bent tip receptacle 125b, which is in communication with a distal portion of the inner fitting tube 125a.

Figure 22:
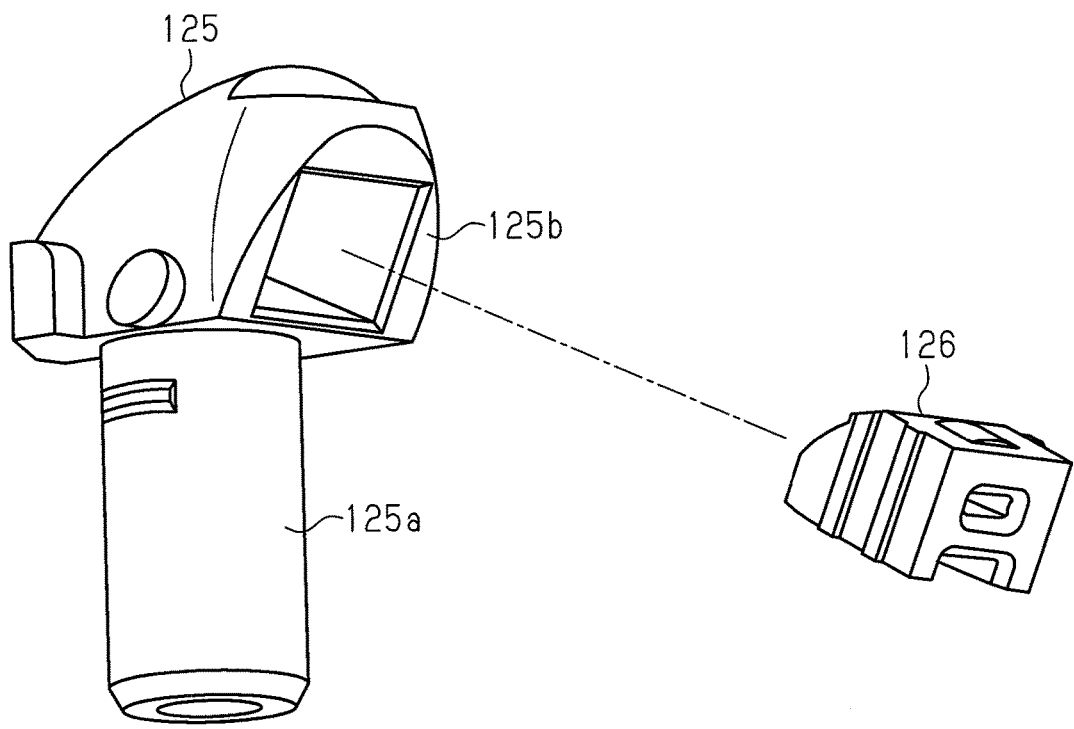
FIG. 22 is an exploded perspective view of a distal nozzle member and a nozzle tip.

As shown in FIG. 22, the nozzle tip 126 is a block that may be fitted to the tip receptacle 125b. As shown in FIGS. 21 and 25, when fitted to the tip receptacle 125b, the nozzle tip 126 forms the ejection ports 8 together with a portion of the inner surface of the tip receptacle 125b. This also determines an ejection direction (ejection axis F (refer to FIG. 25)) and an ejection pattern of the fluid. The ejection axis F of the second embodiment is inclined inward from a direction orthogonal to the frontward-rearward movement direction (in FIG. 25, frontward-rearward movement axis L1) of the nozzle member 109, that is, in a direction in which the nozzle member 109 becomes closer to the center of the lens 105b when moved frontward. Additionally, in the second embodiment, the ejection axis F refers to the center line of the fluid ejected from the ejection ports 108. In the second embodiment, the piston member 124 (ejection ports 108) includes an inner space defining the common intake chamber D that is capable of drawing in a cleaning liquid and air.

As shown in FIG. 21, the distal nozzle member 125 (tip receptacle 125b) includes a distal surface to which a cover 128 is fixed.

The inlet member 122 includes a tubular outer fitting portion 122a, which is fitted onto a basal portion of the cylinder housing 121, a tube 122b, which has a diameter that decreases as extending from a basal end of the outer fitting portion 122a in the axial direction (toward the basal side), an inner extension 122c, which extends radially inward from the basal end of the outer fitting portion 122a, and a tubular inlet 122d, which extends from the inner extension 122c in the cylinder housing 121 (toward the distal side in axial direction). The cylinder housing 121 is provided with space SP formed between the inner extension 122c and the basal flange 124a (lip packing 127). In the nozzle member 109, the basal flange 124a is urged toward the basal side, that is, the inner extension 122c, of the cylinder housing 121 by a compression coil spring 129 including one end supported by the distal portion of the cylinder housing 121. The outer diameter of the inlet 122d is set slightly smaller than the inner diameter of the piston member 124 so that the inlet 122d is loosely fitted to the inner circumferential surface of the piston member 124 from the basal end of the nozzle member 109.

Figure 23:
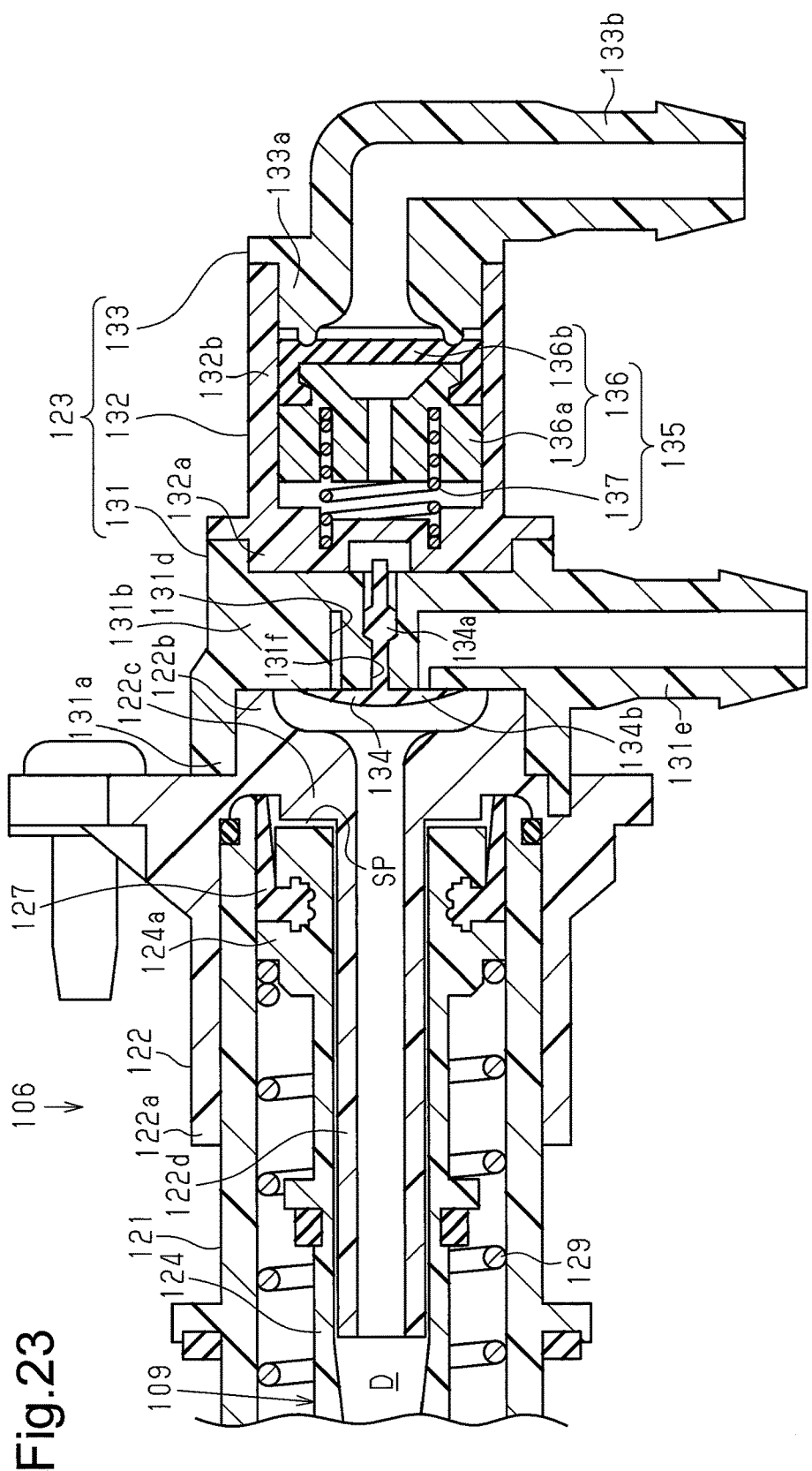
FIG. 23 is a cross-sectional view showing a portion of the nozzle unit.
Figure 24:
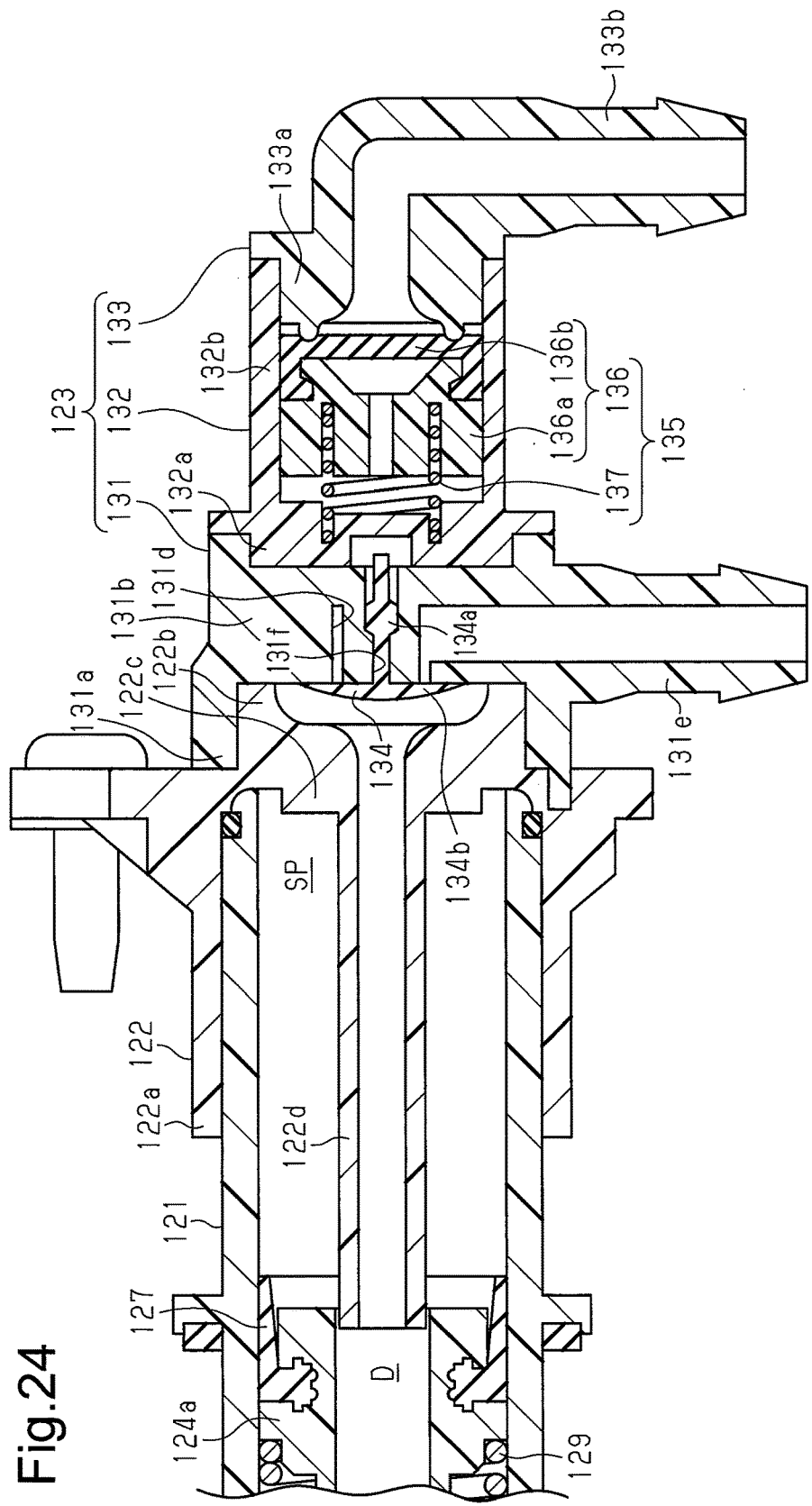
FIG. 24 is a cross-sectional view showing a portion of the nozzle unit.

As shown in FIGS. 18, 21, and 23, the intake member 123 includes first to third intake members 131 to 133. The first intake member 131 includes an outer fitting portion 131a, which is fitted onto the tube 122b of the inlet member 122, and a circular rod 131b, which covers the basal portion of the tube 122b. As shown in FIG. 21, a first cleaning liquid flow passage 131c extends through a circumferential portion of the rod 131b located radially outward in the axial direction (frontward-rearward movement axis L1). Additionally, the rod 131b includes a radially inward portion provided with an annular air flow passage 131d that opens toward the distal side (inlet member 122). As shown in FIG. 23, a tubular air intake passage 131e projects from a circumferential portion of the rod 131b radially outward and includes an interior that is in communication with the air flow passage 131d. Additionally, an air-side check valve 134 is located proximate to an open end of the air flow passage 131d between the air intake passage 131e and the common intake chamber D (inside the piston member 124). The air-side check valve 134, which is an umbrella valve, includes a support shaft 134a and an elastically deformed portion 134b that extends radially outward from one end of the support shaft 134a. The support shaft 134a is inserted and fixed to an axial center hole 131f formed in the rod 131b so that the elastically deformed portion 134b covers the opening of the air flow passage 131d. Thus, the air-side check valve 134 allows air to flow to the common intake chamber D from the air intake passage 131e (air flow passage 131d) and blocks a fluid flowing to the air intake passage 131e (air flow passage 131d) from the common intake chamber D.

The second intake member 132 includes an inner fitting portion 132a, which is fitted into and fixed to a basal portion of the first intake member 131, and a valve reception tube 132b, which extends and has a slightly smaller diameter than the rod 131b. Additionally, a second cleaning liquid flow passage 132c axially extends from the interior of the valve reception tube 132b through a circumferential portion of the second intake member 132 and communicates to the first cleaning liquid flow passage 131c. As shown in FIG. 23, the third intake member 133 includes an inner fitting portion 133a, which is fitted into and fixed to the basal opening of the valve reception tube 132b, and a tubular cleaning liquid intake passage 133b, which communicates with and bends from an inner side of the inner fitting portion 133a located in the valve reception tube 132b and projects radially outward (in present embodiment, same direction as air intake passage 131e). The valve reception tube 132b accommodates a cleaning-liquid-side check valve 135 between the cleaning liquid intake passage 133b and the common intake chamber D (second cleaning liquid flow passage 132c). The cleaning-liquid-side check valve 135, which is a spring-type check valve, includes a valve member 136 and a valve spring 137 that urges the valve member 136. The valve member 136 of the second embodiment is formed by a resin member 136a and a rubber member 136b. The rubber member 136b is urged toward an open end of the third intake member 133 by urging force of the valve spring 137. Thus, the cleaning-liquid-side check valve 135 allows the cleaning liquid to flow to the common intake chamber D (first and second cleaning liquid flow passages 131c, 132c) from the cleaning liquid intake passage 133b and blocks a fluid flowing to the cleaning liquid intake passage 133b from the common intake chamber D. In the structure of the second embodiment, the cleaning-liquid-side check valve 135 and the air-side check valve 134 are arranged next to each other in the longitudinal direction of the cylinder housing 21 (frontward-rearward movement direction of nozzle member 109).

As shown in FIG. 17A, the cleaning liquid intake passage 133b is connected to the washer pump WP by the cleaning liquid hose H1, and the air intake passage 131e is connected to the air pump AP by the air hose H2.

The washer pump WP is capable of feeding the cleaning liquid, which is a fluid stored in the tank T. When the internal pump motor (not shown) is driven, the cleaning liquid is fed to (drawn in) the cleaning liquid intake passage 133b through the cleaning liquid hose H1.

The air pump AP is capable of instantaneously discharging compressed high-pressure air. When driven, air is fed to (drawn in) the nozzle unit 6 (more specifically, air intake passage 32d) through the air hose H2.

As shown in FIG. 17A, the air pump AP and the washer pump WP, which are configured as described above, are electrically connected to the controller 81 and driven by the controller 81.

As shown in FIG. 25, in the second embodiment, the nozzle member 109 is arranged to be movable so that the ejection axis F of the fluid ejected from the ejection ports 108 traverses (passes) a dividing center Y (e.g., refer to FIGS. 18 and 19) that divides the lens 105b (effective surface 105c) into two. More specifically, the dividing center Y intersects with an image capturing range center line X1 and extends through the peak of the lens 105b. The dividing center Y divides the surface of the lens 105b into two, that is, a region close to the nozzle member 109 and a region distant from the nozzle member 109.

More specifically, the nozzle member 109 of the second embodiment is arranged to be capable of moving frontward and rearward in a direction inclined relative to the image capturing range center line X1 so that the ejection ports 108 approach the image capturing range center line X1 of the on-vehicle camera 105 when moved frontward. In other words, the frontward-rearward movement axis L1 of the nozzle member 109 is set to be inclined relative to the image capturing range center line X1 of the on-vehicle camera 105. The nozzle member 109 is arranged to be movable so that the ejection axis F traverses an effective range Z1 (range corresponding to image capturing range W) that extends from one end to the other end of the effective surface 105c and further a lens range Z2 that extends from one end to the other end of the lens 105b. The nozzle member 109 is set to become incapable of moving (frontward) and stop when the ejection axis F traverses the lens range Z2, which extends from one end to a further end of the lens 105b, and reaches the further end (left end in FIG. 25) of the lens 105b.

Additionally, the nozzle member 109 is set so that a cleaning angle $\theta$ formed by the ejection axis F and a tangent line S of the lens 105b where the cleaning liquid hits is 22° or greater. More specifically, when the ejection axis F reaches the further end of the lens 105b (refer to FIG. 25), the cleaning angle $\theta$ is set to be 22° or greater and 32° in the second embodiment. The value of the cleaning angle $\theta$ being 22° or greater is obtained through experimental results. In the experiment, the lens 105b was cleaned in a satisfactory manner (in which smudge was removed almost completely) when the cleaning angle $\theta$ was 22° or greater.

The operation and effect of the controller 81 of the on-vehicle optical sensor cleaning system (on-vehicle optical sensor cleaning device) having the above configuration will now be described.

When the washer pump WP and the air pump AP are not driven, the nozzle member 109 is moved rearward to the non-cleaning position by the urging force of the compression coil spring 129 (refer to FIGS. 18, 20, and 23). Thus, the nozzle member 109 (ejection ports 108) is located outside the image capturing range of the on-vehicle camera 105 (refer to double-dashed line in FIG. 17B). Therefore, if an image is captured when the cleaning is not performed, the ejection ports 108 (distal portion of nozzle member 109) will not interfere with the image capturing.

If a signal for starting the cleaning is received, for example, when the switch SW (refer to FIG. 17A) located in the vehicle is operated or the shift lever SL of the gearshift device is operated to the reverse position, the controller 81 controls the driving of the washer pump WP (pump motor) and the air pump AP (motor 43) so that the fluid is ejected from the ejection ports 108.

More specifically, the controller 81 controls the washer pump WP and the air pump AP as follows. The cleaning liquid is stored in the common intake chamber D, which is located inside the nozzle member 109, to cover the ejection ports 108. Then, air is fed to the nozzle member 109. This ejects a gas-liquid mixture of the cleaning liquid and the air. Additionally, after the gas-liquid mixture is ejected, the controller 81 controls the air pump AP to eject only air.

More specifically, the controller 81 drives the washer pump WP (pump motor) for a predetermined period. This feeds the cleaning liquid to the cleaning liquid intake passage 133b from the washer pump WP through the cleaning liquid hose H1. Then, the cleaning liquid drawn from the cleaning liquid intake passage 133b moves the cleaningliquid-side check valve 135 against the urging force and is supplied into the nozzle member 9 (common intake chamber D). At this time, the cleaning liquid also flows into the space SP located proximate to the basal flange 124*a* through a gap formed due to the loose fitting of the piston member 124 and the inlet 122*d*.

After stopping the washer pump WP (pump motor), the controller 81 drives the air pump AP (motor 43). Consequently, the air is fed to the air intake passage 131*e* of the nozzle unit 106 from the air pump AP through the air hose H2 and then supplied into the nozzle member 109 (common intake chamber D) from the air intake passage 131*e* through the air-side check valve 134. The air is mixed with the cleaning liquid stored in the common intake chamber D and ejected from the ejection ports 108 as the gas-liquid mixture. At this time, the mainstream of the fluid (air) is linearly directed to the distal end (ejection ports 108) of the nozzle member 109 by the inlet 122*d*. Additionally, a side stream of the fluid (air) also flows into the space SP located proximate to the basal flange 124*a* through the gap formed due to the loose fitting between the piston member 124 and the inlet 122*d*. The feeding pressure moves the nozzle member 109 frontward (refer to FIGS. 19, 24, and 25). Consequently, as shown in FIG. 17B, the ejection ports 108 of the nozzle member 109 are moved to the cleaning position from the non-cleaning position to approach the image capturing range center line X1 of the on-vehicle camera 105. More specifically, as the fluid feeding pressure moves (frontward) the nozzle member 109, the fluid is ejected from the ejection ports 108. This cleans the lens 105*b*. FIG. 17B schematically shows the view shown on the display DSP and an ejection port 108 (distal portion of nozzle member 109) located in the image capturing range W. Also, FIG. 1B schematically shows an ejection port 108 (distal portion of nozzle member 109) located at the non-cleaning position outside the image capturing range W indicated by double-dashed lines.

Then, the controller 81 again drives the air pump AP without driving the washer pump WP (pump motor) so that only air is ejected. This feeds air from the air pump AP to the air intake passage 131*e* through the air hose H2. As the air is supplied into the nozzle member 109 (common intake chamber D) from the air intake passage 131*e* through the air-side check valve 134, the nozzle member 109 moves frontward (to the cleaning position). Then, only air is ejected from the ejection ports 8. As a result, the cleaning liquid, which was applied to the lens 5*b* when the gas-liquid mixture was ejected, is blown away by the ejection of only air.

The second embodiment has the advantages described below.

(17) The nozzle member 109 is arranged to be movable so that the ejection axis F of the fluid ejected from the ejection ports 108 traverses the dividing center Y, which divides the lens 105*b* (effective surface 105*c*) into two. Thus, as compared to a nozzle member that becomes immovable when the ejection axis F reaches the dividing center from one side of the dividing center Y (region close to nozzle member 109), the other side of the dividing center Y (left side in FIG. 25 (region distant from nozzle member 109)) may be cleaned in a satisfactory manner. Thus, a wide range of the lens 105*b* may be cleaned in a satisfactory manner.

(18) The nozzle member 109 is arranged to be movable so that the ejection axis F traverses the effective range Z1 (range corresponding to image capturing range W), which extends from one end to the other end of the effective surface 105*c* of the lens 105*b*. Thus, the entire effective range Z1 may be cleaned in a satisfactory manner.

(19) The effective surface 105*c* corresponding to the image capturing range W (refer to FIG. 25) is located on a central portion of the lens 105*b*. The nozzle member 109 is arranged to be movable so that the ejection axis F traverses the lens range Z2, which extends from one end to the other end of the lens 105*b*. Thus, the entire lens range Z2, which includes a periphery of the effective surface 105*c*, may be cleaned in a satisfactory manner.

(20) The nozzle member 109 ejects the fluid from the ejection ports 108 as moved (frontward) by the fluid feeding pressure. This eliminates the need of, for example, an electric driving device that moves the nozzle member 109 and simplifies the structure.

(21) The nozzle member 109 is set so that the cleaning angle θ, which is formed by the ejection axis F and the tangent line of the lens 105*b* where the cleaning liquid hits, is 22° or greater (in second embodiment, 32°) based on the experimental results. Thus, the lens 105*b* may be cleaned in a further satisfactory manner (in which smudge is removed almost completely).

(22) The nozzle member 109 is arranged to be capable of moving frontward and rearward in a direction inclined relative to the image capturing range center line X1 so that the ejection ports 108 approach the image capturing range center line X1 of the on-vehicle camera 105 when moved frontward. Additionally, the ejection axis F is set to be inclined inward from a direction orthogonal to the frontward-rearward movement direction (frontward-rearward movement axis L1) of the nozzle member 109. This reduces the lateral size (sideward direction in FIG. 20) of the device while cleaning in a satisfactory manner. More specifically, to clean in a satisfactory manner, the cleaning angle θ needs to be increased (e.g., 22° or greater) as described above. If the ejection axis F extends in a direction orthogonal to the frontward-rearward movement direction (frontward-rearward movement axis L1) of the nozzle member 109, the frontward-rearward movement direction of the nozzle member 109 would need to be largely inclined relative to the image capturing range center line X1. This increases the lateral size of the device. In this regard, in the above configuration, the cleaning angle θ may be increased (e.g., 22° or greater) without greatly inclining the frontward-rearward movement direction (frontward-rearward movement axis L1) of the nozzle member 109 relative to the image capturing range center line X1. This reduces the lateral size of the device while cleaning in a satisfactory manner.

(23) The cleaning-liquid-side check valve 135, which includes the valve member 136 and the valve spring 137 that urges the valve member 136, is of a spring-type check valve. This prevents a leakage of the cleaning liquid from the cleaning liquid intake passage 133*b* to the common intake chamber D, for example, even when the vehicle starts to move or vibrates while traveling. Thus, a situation may be prevented in which the cleaning liquid is unintentionally leaked from the ejection ports 108 and applied to the lens 105*b* of the on-vehicle camera 105. The spring-type check valve tends to be enlarged as compared to a duckbill-type check valve or the like. However, when this configuration is particularly applied to the present embodiment of the on-vehicle optical sensor cleaning device, the enlargement may be limited in a direction orthogonal to the longitudinal direction of the cylinder housing 121.

The second embodiment may be modified as follows.

In the second embodiment, the nozzle member 109 is arranged to be movable so that the ejection axis F traverses the lens range Z2, which extends from one end to the other end of the lens 105b and includes the outer side of the effective surface 105c corresponding to the image capturing range W (refer to FIG. 25). Instead, the ejection axis F may move in a different range. The nozzle member 109 may be arranged to be movable, for example, so that the ejection axis F traverses the effective range Z1, which extends from one end to the other end of the effective surface 105c, but does not traverse the lens range Z2 (does not reach the further end of the lens 105b (lens range Z2)). Alternatively, the nozzle member 109 may be arranged to be movable, for example, so that the ejection axis F traverses the dividing center Y, which divides the lens 105b into two, but does not traverse the effective range Z1 (does not reach the further end of the effective range Z1).

In the second embodiment, the nozzle member 109 ejects the fluid from the ejection ports 108 as moved (frontward) by the fluid feeding pressure. Instead, for example, the fluid may be ejected from the ejection ports 108 as the nozzle member 109 is moved (frontward) by an electric driving device that is separately arranged.

In the second embodiment, the nozzle member 109 is set so that the cleaning angle θ, which is formed by the ejection axis F and the tangent line of the lens 105b where the cleaning liquid hits, is 22° or greater. More specifically, in the second embodiment, the cleaning angle θ is 32° when the ejection axis F reaches the further end of the lens 105b (refer to FIG. 25). However, the cleaning angle θ may be changed to a different angle.

In the second embodiment, the ejection axis F is set to be inclined inward from a direction orthogonal to the frontward-rearward movement direction (frontward-rearward movement axis L1) of the nozzle member 109. However, the ejection axis F is not limited to this configuration and may be set, for example, in the direction orthogonal to the frontward-rearward movement direction (frontward-rearward movement axis L1) of the nozzle member 109.

In the second embodiment, the controller 81 controls the air pump AP to eject only air after ejecting the gas-liquid mixture. Instead, the control may be terminated when the gas-liquid mixture is ejected without the ejection of only air. Additionally, for example, when a liquid such as raindrops is applied to the lens 5b, only air may be ejected without the ejection of the gas-liquid mixture.

In the second embodiment, the on-vehicle optical sensor unit 103 is arranged on the rear door 2. However, the on-vehicle optical sensor unit 103 may be arranged on any position of a rear portion of the vehicle 1. Further, the on-vehicle optical sensor unit 103 may be arranged on a front portion or a side portion (near door mirror) of the vehicle 1.

The present examples and embodiments are to be considered as illustrative and not restrictive, and the invention is not to be limited to the details given herein, but may be modified within the scope and equivalence of the appended claims.

The invention claimed is:

1. An on-vehicle optical sensor cleaning system comprising:
 a washer pump that feeds a cleaning liquid;
 an air pump that includes a discharge valve and discharges air through the discharge valve, wherein the discharge valve opens when air is compressed in the air pump;
 a nozzle member including an ejection port that ejects a gas-liquid mixture toward a sensing surface of an on-vehicle optical sensor to remove foreign matter from the sensing surface, wherein the cleaning liquid from the washer pump and the air from the air pump are mixed in the gas-liquid mixture; and
 a controller that controls the washer pump and the air pump, wherein the nozzle member includes a common intake chamber located therein, wherein the common intake chamber is in communication with the ejection port and capable of drawing in the cleaning liquid and the air, and the controller is configured so that the gas-liquid mixture is ejected by storing the cleaning liquid in the common intake chamber to cover the ejection port and then feeding the air to the nozzle member.

2. The on-vehicle optical sensor cleaning system according to claim 1, wherein the controller controls the air pump so that after the gas-liquid mixture is ejected, only air is ejected.

3. The on-vehicle optical sensor cleaning system according to claim 1, further comprising a cylinder housing that accommodates the nozzle member, wherein the nozzle member is capable of moving frontward and rearward in the cylinder housing, the nozzle member includes a distal portion provided with the ejection port, and the nozzle member is urged and moved forward by feeding pressure of the air.

4. The on-vehicle optical sensor cleaning system according to claim 1, further comprising:
 a cleaning liquid intake passage that draws in the cleaning liquid;
 an air intake passage that draws in the air;
 a cleaning-liquid-side check valve; and
 an air-side check valve, wherein the nozzle member includes a distal portion provided with the ejection port, the common intake chamber is capable of drawing in the cleaning liquid and the air through the cleaning liquid intake passage and the air intake passage, the cleaning-liquid-side check valve is located between the cleaning liquid intake passage and the common intake chamber, and the air-side check valve is located between the air intake passage and the common intake chamber.

5. The on-vehicle optical sensor cleaning system according to claim 4, further comprising an inlet member configured to communicate a downstream side of the cleaning-liquid-side check valve and a downstream side of the air-side check valve, wherein the inlet member includes a tubular inlet that is loosely fitted to an inner circumferential surface of the nozzle member from a basal end of the nozzle member.

6. The on-vehicle optical sensor cleaning system according to claim 4, further comprising:
 a spring holder; and
  a compression coil spring, wherein the nozzle member includes a piston nozzle member and a flange member, the piston nozzle member includes a tube and a nozzle, wherein the nozzle is bulged radially outward from a distal portion of the tube and includes a distal end that defines the ejection port, the flange member includes a basal flange and is fixed to a basal end of the piston nozzle member, the spring holder is configured to be fitted onto the tube and allow for axial sliding of the tube, the compression coil spring is fitted onto the tube and held in a compressed state between the spring holder and the basal flange, the nozzle member, the spring holder, and the compression coil spring are coupled to assemble a piston unit;
 the piston unit, which has been assembled, is inserted into and coupled to a cylinder housing from a basal end of the cylinder housing, wherein the cylinder housing is configured to accommodate the piston unit, the nozzle projects out of a distal portion of the cylinder housing, and the spring holder engages with the distal portion of the cylinder housing to restrict further movement of the spring holder.

7. The on-vehicle optical sensor cleaning system according to claim 6, further comprising a lip packing, wherein the basal flange of the nozzle member includes a packing fitting recess that extends throughout the circumference and opens radially outward, the lip packing includes an annular fitting portion that is fitted to the packing fitting recess and a slide portion that slides on an inner circumferential surface of the cylinder housing, the packing fitting recess includes a separation restriction groove that axially extends, and the fitting portion includes a separation restriction projection that is fitted to the separation restriction groove.

8. The on-vehicle optical sensor cleaning system according to claim 4, wherein the cleaning-liquid-side check valve and the air-side check valve are arranged next to each other in a longitudinal direction of the nozzle member.

9. The on-vehicle optical sensor cleaning system according to claim 4, wherein the cleaning-liquid-side check valve is a spring-type check valve and includes a valve member and a valve spring that urges the valve member.

10. The on-vehicle optical sensor cleaning system according to claim 1, wherein the nozzle member is movable so that an ejection axis of a fluid ejected from the ejection port traverses a dividing center that divides the sensing surface into two from one side to the other side, and the fluid is one of the cleaning liquid, the air, and the gas-liquid mixture.

11. The on-vehicle optical sensor cleaning system according to claim 1, wherein the nozzle member is movable so that an ejection axis of a fluid ejected from the ejection port traverses an effective range extending from one end to the other end of an effective surface of the sensing surface, and the fluid is one of the cleaning liquid, the air, and the gas-liquid mixture.

12. The on-vehicle optical sensor cleaning system according to claim 1, wherein the nozzle member is capable of moving frontward and rearward in a direction inclined relative to an image capturing range center line of the on-vehicle optical sensor, the nozzle member is configured so that the ejection port approaches the image capturing range center line when the nozzle member is urged and moved forward by feeding pressure of the air, an ejection axis of a fluid ejected from the ejection port is set to be inclined inward from a direction orthogonal to a frontward-rearward movement direction of the nozzle member, and the fluid is one of the cleaning liquid, the air, and the gas-liquid mixture.

13. The on-vehicle optical sensor cleaning system according to claim 1, further comprising an on-vehicle optical sensor attachment bracket including a sensor receptacle and a nozzle receptacle that are formed integrally with each other, wherein the sensor receptacle accommodates the on-vehicle optical sensor so that the sensing surface is exposed to the exterior, the nozzle receptacle is configured to accommodate a nozzle unit that includes the nozzle member, the nozzle member is configured to be capable of moving frontward and rearward to a non-cleaning position and a cleaning position, the nozzle member is configured to eject a fluid from the ejection port toward the sensing surface when the nozzle member is moved to the cleaning position from the non-cleaning position and projected out of the nozzle receptacle, and the fluid is one of the cleaning liquid, the air, and the gas-liquid mixture.

14. The on-vehicle optical sensor cleaning system according to claim 13, wherein the on-vehicle optical sensor attachment bracket includes a liquid release portion capable of receiving the cleaning liquid at a location corresponding to the ejection port of the nozzle member when located at the non-cleaning position.

15. The on-vehicle optical sensor cleaning system according to claim 1, wherein the air pump includes a tubular cylinder, a piston that is movable forward and backward in the cylinder, a motor located at a backward movement side of the piston, wherein the motor drives the piston forward and backward, the discharge valve that includes a discharge valve port and operates to open and close the discharge valve port, wherein inner and outer sides of the cylinder are in communication through the discharge valve port, and a suction valve that includes a suction valve port and operates to open and close the suction valve port, wherein the inner and outer sides of the cylinder are in communication through the suction valve port, when the piston moves forward to reduce space in the cylinder, the air is compressed in the cylinder and the discharge valve opens and discharges the compressed air from the discharge valve port, when the piston moves backward, the suction valve opens and draws air into the cylinder from the suction valve port, the suction valve port is an opening of a piston communication bore located in the piston, and the suction valve port is in communication with the exterior through the piston communication bore and an external communication bore located in a housing for the motor.

16. The on-vehicle optical sensor cleaning system according to claim 4, wherein the nozzle member, the cleaning liquid intake passage, the air intake passage, the cleaning-liquid-side check valve, and the air-side check valve form a nozzle unit.

17. The on-vehicle optical sensor cleaning system according to claim 1, wherein the ejection port has a first cross-sectional area extending in a direction perpendicular to an ejection direction of the gas-liquid mixture, the common intake chamber has a second cross-sectional area extending in a direction perpendicular to a longitudinal direction of the nozzle member, and the first cross-sectional area is smaller than the second cross-sectional area.

18. The on-vehicle optical sensor cleaning system according to claim 1, wherein the nozzle member further includes a bent portion located at a distal side of the nozzle member, and the bent portion is bent so that an ejection axis forms an acute angle with an axis of the common intake chamber along a direction in which the gas-liquid mixture flows.

* * * * *